US009507374B1

(12) United States Patent
Purser

(10) Patent No.: US 9,507,374 B1
(45) Date of Patent: *Nov. 29, 2016

(54) SELECTING MOST COMPATIBLE SYNCHRONIZATION STRATEGY TO SYNCHRONIZE DATA STREAMS GENERATED BY TWO DEVICES

(71) Applicant: The MathWorks, Inc., Natick, MA (US)

(72) Inventor: Robert Purser, Wayland, MA (US)

(73) Assignee: The MathWorks, Inc., Natick, MA (US)

( * ) Notice: Subject to any disclaimer, the term of this patent is extended or adjusted under 35 U.S.C. 154(b) by 356 days.

This patent is subject to a terminal disclaimer.

(21) Appl. No.: 13/692,382

(22) Filed: Dec. 3, 2012

Related U.S. Application Data

(63) Continuation of application No. 12/723,157, filed on Mar. 12, 2010, now Pat. No. 8,327,029.

(51) Int. Cl.
*G06F 1/12* (2006.01)
*G06F 7/20* (2006.01)
*H04N 5/05* (2006.01)

(52) U.S. Cl.
CPC . *G06F 1/12* (2013.01); *G06F 7/20* (2013.01); *H04N 5/05* (2013.01)

(58) Field of Classification Search
CPC ............ G06F 19/00; G06F 1/12; G06F 7/20; H04N 5/04; H04N 9/475; H04B 7/088
USPC .................................................. 713/400, 500
See application file for complete search history.

(56) References Cited

U.S. PATENT DOCUMENTS

| | | | | |
|---|---|---|---|---|
| 4,686,706 A | * | 8/1987 | Sakai | ............... H04N 21/4888 348/E5.084 |
| 5,452,006 A | * | 9/1995 | Auld | ....................... 375/240.26 |
| 6,138,089 A | * | 10/2000 | Guberman | ............. G10L 19/02 704/207 |
| 6,247,135 B1 | * | 6/2001 | Feague | ........................ 713/400 |
| 6,477,204 B1 | * | 11/2002 | Fukushima et al. | ...... 375/240.28 |
| 6,587,898 B1 | * | 7/2003 | Larson et al. | .................. 710/31 |
| 6,594,773 B1 | * | 7/2003 | Lisitsa et al. | ................ 713/600 |
| 6,748,440 B1 | * | 6/2004 | Lisitsa et al. | ................ 709/231 |
| 6,925,555 B2 | * | 8/2005 | Chang et al. | ..................... 713/1 |
| 7,023,817 B2 | * | 4/2006 | Kuffner et al. | .............. 370/324 |
| 7,266,713 B2 | * | 9/2007 | Lienhart et al. | ............. 713/500 |
| 7,483,925 B2 | * | 1/2009 | Koskimies et al. | |
| 2001/0011313 A1 | * | 8/2001 | Hungerbuehler et al. | .... 710/102 |
| 2002/0069039 A1 | | 6/2002 | Ricks et al. | |
| 2002/0138242 A1 | | 9/2002 | Wilensky et al. | |
| 2003/0118081 A1 | | 6/2003 | Philips et al. | |

(Continued)

*Primary Examiner* — Thomas Lee
*Assistant Examiner* — Santosh R Poudel
(74) *Attorney, Agent, or Firm* — Nelson Mullins Riley & Scarborough LLP

(57) ABSTRACT

In an embodiment, a session associated with a first hardware device that sends or receives a first data stream and a second hardware device that sends or receives a second data stream may be provided. The session may be used to access information related to the first hardware device and the second hardware device. The accessed information may be used to identify a strategy from among a plurality of strategies for synchronizing either the first data stream and the second data stream or the first hardware device and the second hardware device. The identified strategy may be applied to synchronize either the first data stream and the second data stream or the first hardware device and the second hardware device.

17 Claims, 12 Drawing Sheets

(56) References Cited

U.S. PATENT DOCUMENTS

| | | | |
|---|---|---|---|
| 2004/0176952 A1* | 9/2004 | Fado et al. | 704/233 |
| 2005/0104876 A1* | 5/2005 | Yanagisawa et al. | 345/204 |
| 2005/0206072 A1* | 9/2005 | Tanabe | 271/226 |
| 2006/0209210 A1* | 9/2006 | Swan | H04N 5/04 348/515 |
| 2007/0028274 A1* | 2/2007 | Walker | H04N 7/24 725/90 |
| 2007/0047590 A1* | 3/2007 | Curcio et al. | 370/503 |
| 2007/0110110 A1* | 5/2007 | Miki et al. | 370/535 |
| 2007/0280098 A1 | 12/2007 | Bhatt et al. | |
| 2008/0086654 A1* | 4/2008 | Sogabe et al. | 713/501 |
| 2008/0109561 A1 | 5/2008 | Van Gassel et al. | |
| 2008/0172649 A1 | 7/2008 | Bisso et al. | |
| 2008/0259966 A1* | 10/2008 | Baird | H04J 3/0632 370/503 |
| 2009/0021639 A1 | 1/2009 | Geen et al. | |
| 2009/0027338 A1* | 1/2009 | Weinberg | G06F 3/017 345/158 |
| 2009/0096921 A1* | 4/2009 | Katayama | 348/469 |
| 2009/0158075 A1* | 6/2009 | Biberstein et al. | 713/375 |
| 2009/0172200 A1 | 7/2009 | Morrison et al. | |
| 2009/0177295 A1* | 7/2009 | Niemi | G06F 17/17 700/42 |
| 2009/0177800 A1 | 7/2009 | Gidron et al. | |
| 2009/0240998 A1 | 9/2009 | Nikkila et al. | |
| 2009/0248749 A1* | 10/2009 | Gu et al. | 707/104.1 |
| 2010/0030509 A1* | 2/2010 | Crain, II et al. | 702/123 |
| 2010/0061493 A1* | 3/2010 | Takahashi et al. | 375/343 |
| 2010/0115047 A1 | 5/2010 | Briscoe et al. | |
| 2010/0118864 A1 | 5/2010 | Kubler et al. | |
| 2010/0210219 A1* | 8/2010 | Stirling-Gallacher | H04B 7/088 455/67.11 |
| 2010/0235528 A1 | 9/2010 | Bocharov et al. | |
| 2011/0068975 A1* | 3/2011 | Zietz | G01S 19/35 342/357.36 |
| 2011/0180726 A1* | 7/2011 | Gratton et al. | 250/459.1 |

* cited by examiner

SELECTING MOST COMPATIBLE SYNCHRONIZATION STRATEGY TO SYNCHRONIZE DATA STREAMS GENERATED BY TWO DEVICES

BACKGROUND

Hardware devices may interface with other hardware devices in order to acquire data or perform tasks. Hardware devices may include, for example, instruments or measurement devices that gather, generate, and output data. In some situations, multiple hardware devices sending and receiving multiple streams of data must cooperate with each other.

For example, consider a system including a video camera recording images at a rate of 4000 frames/second (fps) and a microphone recording audio data at a rate of 128 kbit/second (kbps). In some situations, it may be desirable to synchronize the images recorded by the camera with the audio recorded by the microphone so that the precise event described in one or more pictures can be correlated to the sound that the event generated. Such a procedure is useful, for example, in laryngeal cinematography, wherein the motions of a patient's larynx are correlated to sounds produced in the larynx.

In order to synchronize the data, it may be necessary for the hardware devices to communicate with each other. Hardware devices typically provide for analog input, analog output, and digital I/O from a variety of data acquisition hardware. The hardware devices may use one or more types of interdevice connections and protocols in order to communicate with each other. In order to facilitate interaction between hardware devices and between hardware devices and software environments, various types of tools have been developed. For example, Test & Measurement tools may provide a means for two or more hardware devices to interact with each other in order to perform a diagnostic test or take a measurement. Industrial Automation tools may similarly provide an interface between hardware devices in order to monitor the state of the hardware devices during an industrial task.

DETAILED DESCRIPTION

Figure 1A:
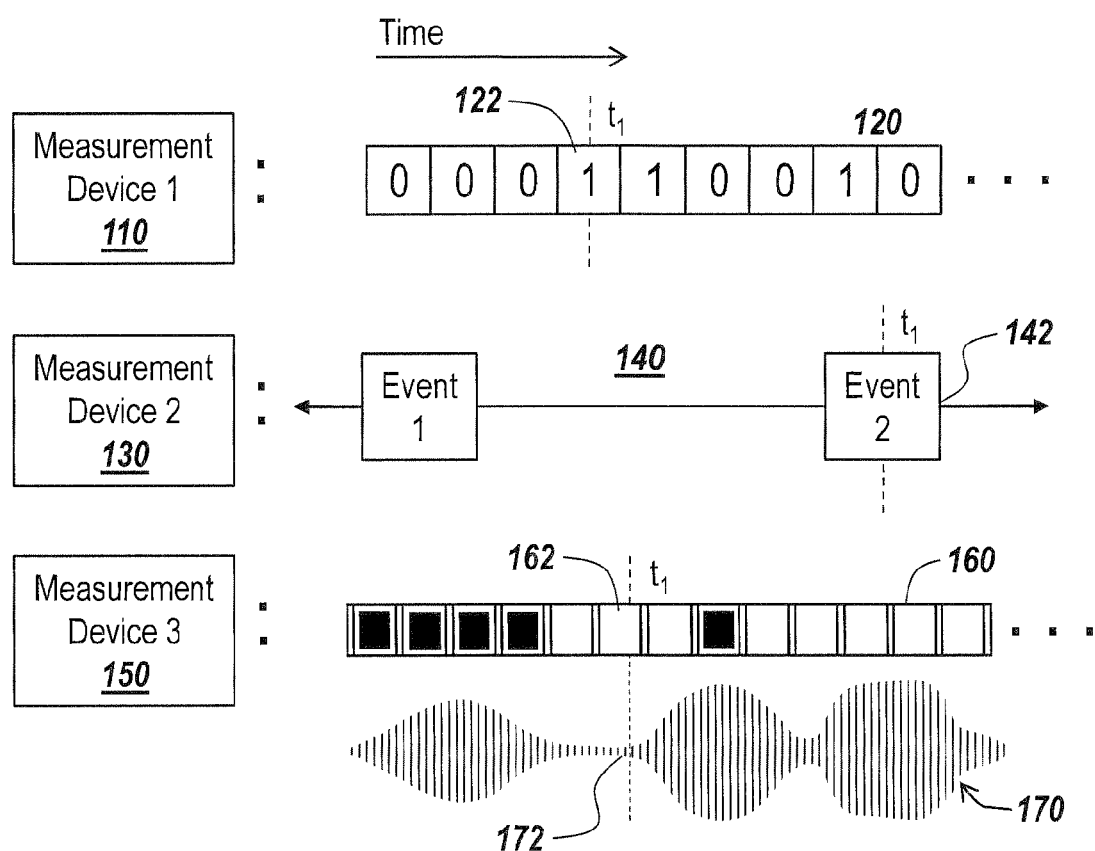
FIG. 1A depicts unsynchronized data obtained from three measurement devices.

Typically, conventional tools use software to represent each device in a system of devices individually. Conventional tools do not possess knowledge of the system as a whole or the different ways that devices in the system are or may be connected. Accordingly, conventional tools offer point solutions that often rely on a specific type of communication protocol or hardware interconnection. As a result, conventional tools are often specific to particular type or group of devices or task.

Historically, because of a wide variety of instruments and protocols that are used to communicate with and between hardware devices, it has been difficult or impossible to establish and maintain interfaces to many types of hardware devices. When such an interface can be established, it is often the case that the interface has very limited available capabilities. For example, a conventional interface may be unable to synchronize a hardware device of a first type collecting a first type of data with a hardware device of a second, different type collecting a second, different type of data (such as the pictures and sound data in the example described above).

In many situations, performing a measurement may require a system of multiple hardware devices that acquire different types of data simultaneously. Whereas conventional tools typically represent each device in a system as a separate entity (and therefore only possess device-level information), the present application describes exemplary software constructs that may span devices and may represent a system as a whole. Such constructs, referred to herein as a "session," allow for simple configuration of interdevice behaviors, such as triggering and synchronization. By treating the system of devices as a whole, the session may gather and analyze system-level configurations and behavior, which allows the session to synchronize devices and analyze and process data more efficiently than the conventional point solution. Further, because the session possesses system-level information, the session may make recommendations regarding possible improvements to the system that may result in better synchronization outcomes.

The data that is gathered and/or manipulated by the hardware devices may be imported from the hardware devices into a software environment providing the session. The software environment may allow for the configuration of hardware devices, data transfer into analysis environments (such as, but not limited to, MATLAB® and Simulink® environments of The MathWorks, Inc., of Natick, Mass.), and data output. Using these software environments, data may be analyzed, visualized and saved. Moreover, these tools may allow data acquisition procedures to be customized and built-in features of hardware devices to be accessed. Some embodiments may further enable users to incorporate live data or hardware configurations directly into block diagram models, such as block diagram models provided by Simulink. Users may then verify and validate a model against live, measured data as part of a system development process.

Further, one or more embodiments may provide logic and heuristics for synchronizing devices or data streams. In some embodiments, methods, systems, and devices may be presented for aligning two or more data streams and outputting the aligned data streams. Accordingly, in some embodiments a library of synchronization strategies may be provided for that may be used to develop multiple custom solutions to device synchronization. One or more of the synchronization strategies in the library may be compared to a system of hardware devices, and the synchronization strategies may be ranked based on their compatibility with the system. One or more recommendations for synchronizing the system of measurement devices may be displayed and, in response to a selection of one of the synchronization strategies, the selected strategy may be used to synchronize the system.

TERMINOLOGY

As used herein, the term "optimized" may include improving a performance or efficiency of an operation. Note that the improved performance or efficiency of the operation need not be the best or optimum possible for that operation. The term "minimized" may include reducing a size or amount of a quantity involved. Note that the reduced size or amount of the quantity need not be the minimum possible quantity. The term "maximized" may include increasing a size or amount of a quantity involved. Note that the increased size or amount of the quantity need not be the maximum possible quantity.

"Hardware devices" may include, but are not limited to, mechanical, magnetic, electronic, and electrical devices that may be part of a computer or other electronic system. Examples of hardware devices may include, but are not limited to, computers, peripherals, measurement devices, and acquisition systems. Measurement devices or acquisition devices may include instruments and devices that may generate an input or output to facilitate a collection of measurement information. Measurement devices may obtain and compare physical quantities or characteristics related to objects and events. Examples of measurement devices may include, but are not limited, still cameras, video cameras, microphones, sensors (such as temperature sensors, pressure sensors, and tactile sensors), diagnostic devices, rangefinders, voltmeters, flow meters, speedometers, accelerometers, force gauges, strain gauges, barometers, dynamometers, and ballistic pendulums. Acquisition systems may acquire data. A device under test may be a hardware device from which information may be collected. The information may be collected as part of a diagnostic test.

"Data" may include information or collections of information that may represent qualitative or quantitative attributes of a variable or set of variables. Data may be the result of a measurement and therefore may be gathered from one or more measurement devices or a device under test. Data may refer to any type of machine-readable information having substantially any format that may be adapted for use in one or more networks and/or with one or more devices. Data may include digital information or analog information. Data may further be packetized and/or non-packetized. Data streams may include sequences of units of data which may or may not be related, and which may be arranged, for example, by time.

Data may be described by a "data domain," which may refer to one or more types or common characteristics of the data. Data domains may include, but are not limited to, one-dimensional data, multi-dimensional data, event-based data, time-based data, stream-based data (such as a stream of one-dimensional data), and frequency data.

Often, when two or more hardware devices supply different sets of data, the data must be synchronized. As used herein, "synchronization" may include, but is not limited to, processes and procedures that may align corresponding points in two or more different inputs or outputs. Synchronization may be applied to data so that, for example, two or more different data sets or data streams may be maintained or set into unison with one another. Synchronization may involve arranging points in a collection of data with corresponding points in another collection of data with reference to a common attribute, such as time. Synchronization may be applied as the data is collected or may be applied after the data is collected (e.g., during post processing). In some instances, synchronization may also involve manipulating a configuration of a system prior to collecting data, in order to better align the data during collection. Synchronization may also be applied to devices so that the devices may send and receive corresponding aligned inputs and outputs.

In order to facilitate device synchronization, configuration, and representation of devices, as well as alignment, processing, and collection of data, exemplary embodiments may provide a "session" that interacts with a system of hardware devices. The session may be realized as an object, class, or other software construct that may incorporate system-level knowledge of devices and data in order to, for example, more accurately acquire and process information about the system.

Exemplary Embodiments

Hardware devices may be used to generate, transmit, or receive one or more representations of data, such as data streams. In order for the data to be useful, it may be necessary to synchronize the data. For example, FIG. 1A depicts initially unsynchronized data obtained from three measurement devices 110, 130, 150. Each of the measurement devices 110, 130, 150 measures data over time, although the data is of different types (data types are discussed in detail with respect to FIG. 4, below) and the time at which each data unit is measured is not correlated between devices.

A first measurement device 110 may provide a stream of one-dimensional data 120. The stream 120 may include Boolean data. A data unit in the stream 120 may represent whether a temperature measured by the measurement device 110 exceeded a threshold temperature for a specified time span (e.g., 1 ms). In the embodiment depicted, data unit 122 indicates that the value changed from 0 to 1 at time $t_1$.

A second measurement device 130 provides event-based data 140. Specifically, the measurement device 130 outputs a message upon the occurrence of an event. As noted in FIG. 1A, an event 142 occurs at time $t_1$.

A third measurement device 150 outputs two data streams 160, 170. The first data stream 160 may include a stream of multi-dimensional data that may represent, for example, images captured by a camera on the device 150. The second data stream 170 may include frequency-based data that may represent, for example, audio captured by an audio recorded on the device 150. As shown in FIG. 1A, one unit of data 162 in the data stream 160 corresponds to time $t_1$, as does a unit of data 172 in the second data stream 170.

Accordingly, each of the data streams 120, 140, 160, 170 may represent data collected during the same general period of time. However, because the data streams are unsynchronized, it is difficult to tell which data readings occurred simultaneously, and therefore it is difficult to draw correlations or conclusions from the data. Accordingly, FIG. 1B depicts the data of FIG. 1A synchronized according to an exemplary embodiment.

Figure 1B:
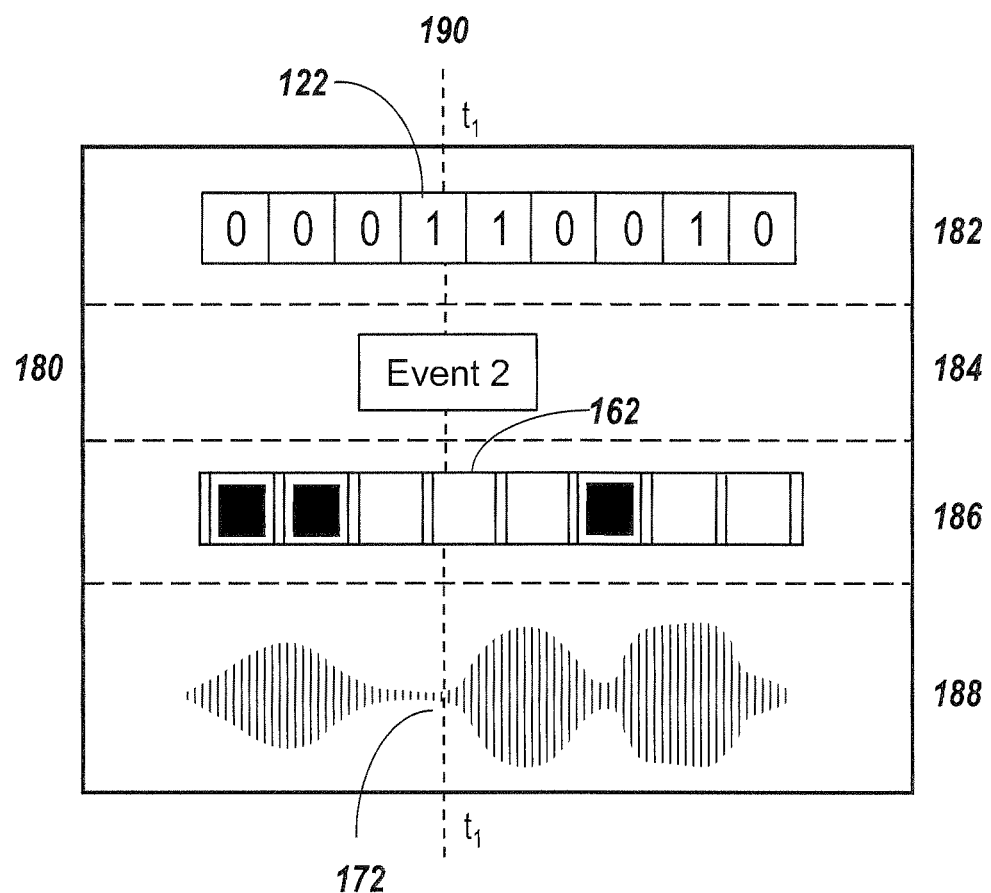
FIG. 1B depicts the data of FIG. 1A synchronized according to an exemplary embodiment.

In FIG. 1B, points in the individual data streams have been identified and aligned. In exemplary embodiments described herein, the points may be aligned based on a synchronization strategy which may take into account, for example, unique signatures in the data, communication paths between the hardware devices 110, 130, 150, triggering signals sent or received by the hardware devices 110, 130, 150, clock signals associated with one or more of the hardware devices 110, 130, 150, a sample rate or type of the hardware devices 110, 130, 150, and/or other factors that may be relevant to synchronization.

The aligned data 180 may be held in four data arrays 182, 184, 186, 188, which may correspond to data streams 120, 140, 160, 170, respectively. As shown in FIG. 1B, the data streams 120, 140, 160, 170 are aligned so that a point corresponding to time $t_1$ occurs at the same point in each of the data arrays 182, 184, 186, 188. Accordingly, the aligned data 180 may be considered to represent a matrix of multi-dimensional data aligned in time.

Figure 2A:
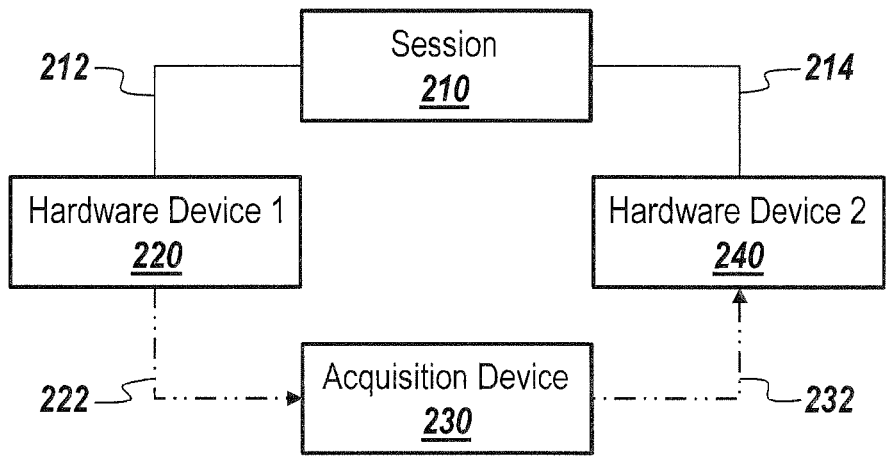
FIG. 2A depicts a session interacting with hardware devices according to an exemplary embodiment.

The data acquired from the hardware devices may be aligned using a session. FIG. 2A depicts an exemplary session 210 interacting with various hardware devices according to an exemplary embodiment. Referring to FIG. 2, the session 210 may be a unified software construct that may span devices 220 and 240, which may be in a system of hardware devices, and may be used to represent the system as a whole. Using the session 210, interdevice behavior (e.g., communication between devices 220 and 240) may be simply and accurately configured. Interdevice behavior, as used herein, may include, but is not limited to, triggering actions, communication or transmission of data, and/or synchronization actions.

As depicted in FIG. 2A, a system may include two hardware devices 220, 240 and an acquisition device 230. The hardware devices 220, 240 may be, for example, measurement devices and the acquisition device 230 may be, for example, a device under test.

The session 210 may access the first hardware device 220 through an optional connection 212. The connection 212 may allows the session 210 to query the first hardware device 222 for information, such as, for example, device type, device vendor, type and status of inputs and outputs on the first hardware device 222 and type and status of data streams collected or transmitted by the first hardware device 222. Similarly, the session 210 may be connected to the second hardware device 240 through a second optional connection 214.

In some embodiments, the session 210 may not be directly connected to the first hardware device 220. Instead, information about the hardware device may be provided through a graphical or textual interface (see, e.g., FIGS. 5A and 5B), or the session 210 may acquire information about the first hardware device 220 through another hardware device which the session 210 may have access to and which may acquire information about the first hardware device 220. For example, information about the first hardware device 220 may be provided to the session 210 through the acquisition device 230 or the second hardware device 240.

In FIG. 2A, the first hardware device may output a first stream of data 222, which may be received by the acquisition device 230. The acquisition device 230 may process the data or perform some other task using the data. The acquisition device 230 may output a second stream of data 232, which may be received at the second hardware device 240. The second hardware device 240 may process the received second stream of data 232.

An example of the system depicted in FIG. 2A may be a diagnostic system for evaluating an airplane. Here, acquisition device 230 may be attached to the airplane in order to evaluate and diagnose various systems within the airplane. First hardware device 220 may provide outputs that are meant to probe various systems of the airplane, which may be received by the acquisition device 230 and may be used to test the airplane's systems. Information from the acquisition device may be forwarded to the second hardware device 240 on second data stream 232. The second hardware device 240 may analyze the forwarded information.

The second hardware device 240 may require synchronization information in order to ensure that the data received on the second data stream 232 is properly correlated to the data provided by the first hardware device 220 over the first data stream 222. For example, if the data is indexed by time, it may be important for the second hardware device 240 to know when certain parts of the data originated at the first hardware device 220. For example, if the first hardware device 220 transmits 5 megabytes (MB) of data relevant to a first system test, and then 2 MB of data relevant to a second system test, it may be important for the second hardware device 240 to know when the transition from the first system test to the second system test occurs. Alternatively, if an event occurs which is picked up by the acquisition device 230 in the middle of a test, the second hardware device 140 may require information allowing the cause of the event to be correlated to the data provided by the acquisition device 230. Interdevice communication and synchronization may be made more difficult if the devices 220, 230, 240 are of different types or manufactured by different vendors.

Further, if the first hardware device 220, the device under test 230, and/or the second hardware device have different sampling rates or times, knowing that they have different sampling rates or times may be important in the processing of the data. Other information that may be relevant may include whether and when certain triggering conditions are met, the status of one or more clock signals related to one or more of the hardware devices 220, 240 and the acquisition device 230, and the status of the devices 220, 230, 240 themselves.

In the situation depicted in FIG. 2A, the session 210 may recognize that there is no direct communication link between the first hardware device 220 and the second hardware device 240. Accordingly, the session 210 may acquire information about the hardware devices 220, 140, and the data streams 222, 232 transmitted or received by the hardware devices 220, 240, and may apply a synchronization strategy on the basis of the acquired information.

For example, the session 210 may acquire information related to the sample rate of the hardware devices 220, 240, the start and stop times of operations on the devices 220, 230, 240, the presence or absence of triggering events or signals employed by the devices 220, 230, 240, the clock signals used by the devices 220, 230, 240, and the presence or absence of unique signatures present in the data streams 222, 232. Based on the acquired information, the session 210 may search a library of strategies (discussed in more detail with reference to FIG. 3, below) for a strategy appropriate to this particular situation and may apply the strategy to synchronize the data. For example, the session 210 may identify a behavioral strategy that may apply post-processing to the data, taking into account, for example, the sample rates, clock signals, triggering signals, and unique signatures of the data and devices, and may post-process the data to align points on the input signal 222 and the output signal 232.

Although FIG. 2A is depicted with respect to a particular system configuration, it should be noted that the present invention is not limited to the particular system configuration depicted. For example, instead of an acquisition device 130, hardware devices 220, 240 may be measurement devices that may receive input to measure a phenomenon. For example, the first hardware device 220 may be a camera that acquires images at a regular or fixed rate over time, and the second hardware device 240 may be an audio recorder that records sound at a regular or fixed rate over time. In such a situation, it may be important to synchronize the data acquired by each of the hardware devices 220, 240 so that auditory events (as captured by the audio recorder) that gave rise to a particular sound phenomenon can be correlated related physical events (as captured by the camera).

Figure 2B:
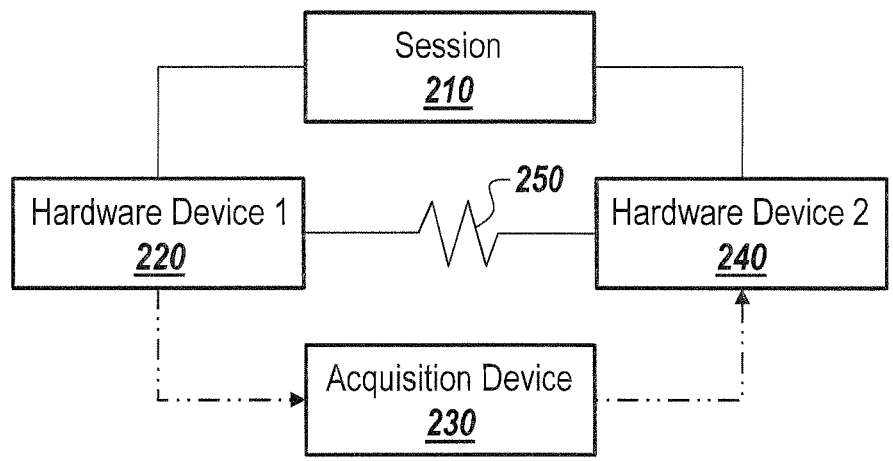
FIG. 2B depicts the session interacting with hardware devices connected by a communication link according to another exemplary embodiment.

Synchronization may be made simpler by the presence of communication links in the system. For example, FIG. 2B depicts an exemplary embodiment where session 210 interacts with hardware devices connected by a communication link 250. In the system depicted in FIG. 2B, synchronization information, such as triggering signals, clock signals, or other information, may be sent directly from the first hardware device 220 to the second hardware device 240 over the communication link 250. The information sent over the communication link 250 may allow the second hardware device 240 to correlate data, transmitted from the first hardware device 220 to the acquisition device 230, to data received by the second hardware device 240.

In a system configuration like the one depicted in FIG. 2B, the session 210 may decide to employ a different strategy than in a situation like the one depicted in FIG. 2A. For example, in FIG. 2B, the session 210 may decide that a hardware-based strategy is more appropriate than a behavior-based strategy or unique-signature-based strategy.

In some embodiments, the session 210 may recommend changes to an existing configuration in order to, for example, make synchronization faster, more accurate, more efficient, or simpler. For example, when presented with a system configuration of the system depicted in FIG. 2A, where no communication link is provided between the first hardware device 220 and the second hardware device 240, the session may identify a strategy that may be reasonably good (though not perfect) for the system.

In some embodiments, the session 210 may identify a strategy involving a communication link provided between the first hardware device 220 and the second hardware device 240. The session 210 may use information identifying characteristics of the first hardware device 220 and/or the second hardware device 240 (e.g., the presence or absence of compatible input and/or output ports on each of the hardware devices) in order to determine if an improvement can be made to the system configuration. If an improvement can be made, the session 210 may recommend that the improvement be made. For example, when presented with a system configuration like the one depicted in FIG. 2A, the session 210 may recommend that a communication link 250 be provided between the first hardware device 220 and the second hardware device 240, as depicted in FIG. 2B. A user may provide the communication link, or a user may opt not to provide the communication link, in which case the session 210 may recommend or apply alternative strategies.

Figure 3:
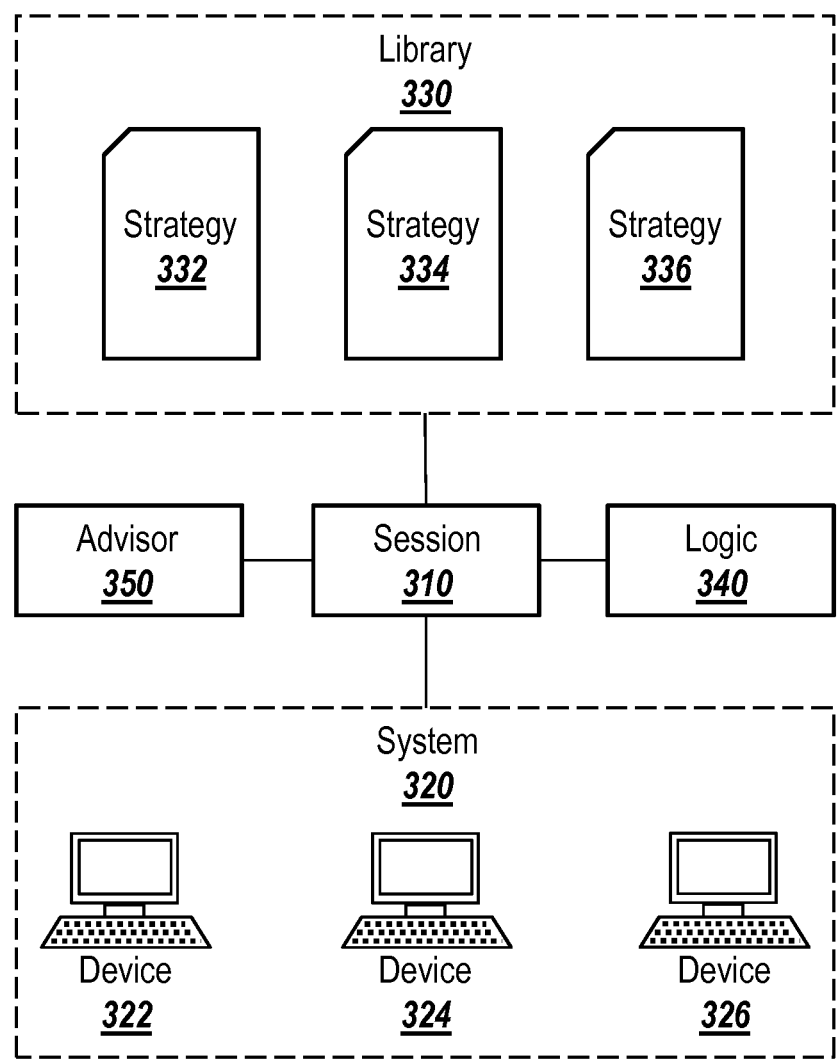
FIG. 3 depicts an overview of a session for synchronizing devices or data streams associated with a system according to exemplary embodiments.

FIG. 3 depicts an overview of an exemplary session 310 interacting with a system 320 according to exemplary embodiments. Using the session 310, configuration options may be set for the system 320 as a whole. This may allow, for example, a common sample rate to be set across each of the devices 322, 324, 326 in the system 320. System-level properties, such as a time for acquiring certain data (i.e., the acquisition time), may also be set using the session 310. Further, actions such as starting and stopping (for example, starting or stopping a measurement task) may be applied to each of the devices 322, 324, 326 in the system 320 using a single command.

Moreover, some operations may be optimized or improved using the session 310 for better system-wide performance. Operations that typically would be performed serially may be performed in parallel, or operations that would normally be applied in a certain order may be performed in a more efficient order using the session 310. For example, when starting, the session 310 may configure each of the devices 322, 324, 326 in the system 320 prior to commencing operation, and issue a start command to each device (in contrast to, for example, configuring a device 322, issuing a start command to the device 322, and then configuring another device 324). This allows the latency between the devices 322, 324, 326 to be minimized at start-up.

Further, because the session 310 may possess system-level knowledge (and therefore understand or view the system as a whole), the session 310 may specify the relationship between devices. For example, the session 310 may designate one device 322 as the master device and another device 324 as the slave device based on its knowledge of the system. Using the session to designate the devices 322, 324 as such may avoid a need to specify low-level properties on each device 322, 324.

In addition, using the session 310, sophisticated algorithms for automatically synchronizing two or more devices 322, 324 under certain circumstances may be specified. For example, if multiple subsystems for a single device 322 are in use, the session 310 may automatically configure the multiple subsystems so that the subsystems are synchronized with each other using built-in synchronization buses present in the single device 322.

The session 310 may have access to a library 330 of synchronization strategies 332, 334, 336 for synchronizing two or more devices 322, 324, 326. The library 330 may include a single synchronization strategy, or, more typically, may include multiple synchronization strategies. One or more of the strategies 332, 334, 336 may be represented using any suitable format, such as, for example, extensible markup language (XML), text, a block-diagram format, or a format generated by an array-based environment, such as MATLAB's .MAT format. The library 330 may be a suitable device or structure for storing the synchronization strategies 332, 334, 336, such as a database, a file server, a hard drive, an optical medium, a magnetic medium, or an operating system file structure.

It should be noted that the strategies need not be represented specifically as a library 330, but may be represented using any suitable construct.

The library 330 of strategies 332, 334, 336 may include a number of different types of strategies for synchronizing the hardware devices 322, 324, 326 in the system 320. For example, the library 330 may include a combination of hardware-based strategies, behavioral strategies, and signature-based strategies. These strategy types are described in more detail below.

A hardware-based strategy may be a strategy that may leverage existing hardware in the system 320 to facilitate synchronization of the data. The hardware need not be the entire hardware device 322; rather, the strategy 332 may involve components of the hardware device, such as a port or channel. For example, the strategy 332 may recognize that a hardware device 322 may include in output port that may be compatible with an input port of another hardware device 324 in the system 320. Accordingly, the strategy may involve connecting the input port to the output port so that synchronization information, such as a clock signal, can be sent between the hardware devices 322, 324 during a data collection event.

A wide variety of hardware-based strategies may be employed. The hardware-based strategies may recognize that particular types of compatible hardware connections or protocols may be existent in the system, and may make recommendations based on the type of hardware connection or protocols that may exist in the system or be used with the system. Exemplary hardware connections and protocols may include, but are not limited to, PCI Extensions for Instrumentation (PXI), LAN Extensions for Instrumentation (LXI), VME Extensions for Instrumentation (VXI), General Purpose Interface Bus (GPIB).

Behavioral strategies may involve configuring, regimenting, or recognizing a behavior of the hardware devices 322, 324, 326 or data collected in the system 320 in order to facilitate synchronization. Behavioral strategies may involve, for example, post-processing of data or preconfiguration of the hardware devices 322, 324, 326 in the system 320. Post-processing involves recognizing information about the hardware devices 322, 324, 326 or the data collected by the system 320 that allows the devices or data to be synchronized after the data is collected. For example, a hardware device 322 may send a synchronization signal at particular points in time, which may be used by another device 324 to synchronize data.

Another example of post-processing data may involve calculating a system latency factor "L" which may represent an average time between when a particular unit of data is transmitted by a first hardware device and received by a second hardware device. The latency factor "L" may be subtracted from the time that the unit of data is received at the second hardware device in order to determine at what time the data unit originated at the first hardware device. For example, if a first hardware device transmits time-dependent data to an acquisition device at time $t_1$, and the acquisition device processes the data and forwards the data to a second hardware device, the second hardware device may receive the data at time $t_2$. The second hardware device may attempt to determine when the original data was transmitted (time $t_1$) by subtracting the latency factor "L" from time $t_2$. Given the latency factor "L" is accurate, it should be the case that $t_2-L=t_1$.

A signature-based strategy may search for unique signatures in data streams. For example, if three hardware devices 322, 324, 326 are used to measure quantities related to a car undergoing testing, the car horn may be honked at the start of testing to provide a unique signature that will be recorded by each of the three hardware devices 322, 324, 326. The honk may be recognized based on the unique signature it creates in the data streamed from each of the hardware devices 322, 324, 326. Based on the unique signature, the data streams can be synchronized by aligning points in each of the data streams corresponding to the unique signature.

Some synchronization strategies 332, 334, 336 may be more suited to particular system 320 configurations, while some synchronization strategies 332, 334, 336 may not be compatible with a given system 320 configuration at all. Accordingly, the session 310 may apply logic 340 and heuristics to evaluate the synchronization strategies 332, 334, 336 in the context of the specific configuration of the system 320, which the session 310 is accessing. Logic 340 may include, for example, a set of rules or a methodology for determining a degree of compatibility between two or more compared representations (logic 340 is discussed in more detail in relation to FIG. 4, below). Based on the logic 340, the session 310 may generate a quantitative or qualitative analysis of the degree of compatibility between an evaluated strategy 332 and a particular system 320 configuration. If more than one strategy 332, 334 is compatible with a system 320 configuration, the strategies 332, 334 may be ranked according to their degree of compatibility based on the logic 340. The session 310 may apply the highest-ranked strategy to synchronize the hardware devices 322, 324, 326 in the system, or the session may present one or more strategies 332, 334, 336 to a user so that the user may select which strategy to employ. Depending on the particular strategies recommended, it may be possible to apply two or more strategies to a given system 320. For example, the session 310 may recommend applying both a behavioral and a hardware-based strategy.

Further, if one of the strategies 332, 334, 336 closely matches the configuration of the system but is not a perfect fit (for example, due to one or more missing components in the system 310), the session 310 may use the advisor 350 to determine if an improvement can be made in the system 320. The advisor 350 may include a set of rules or heuristics that may be used to evaluate a strategy 332 in the context of a system 320 and determine if the system 320 could be modified to implement the strategy (the advisor 350 is described in more detail with reference to FIG. 6, below). If the advisor 350 determines that an improvement is possible, the session 310 may recommend making the improvement.

Although the session 310, the system 320, the library 330, the logic 340, and the advisor 350 are shown as separate components in FIG. 3, it should be understood that functionality of various components may be combined, or all of the components may be represented together as a single hardware or software construct.

Figure 4:
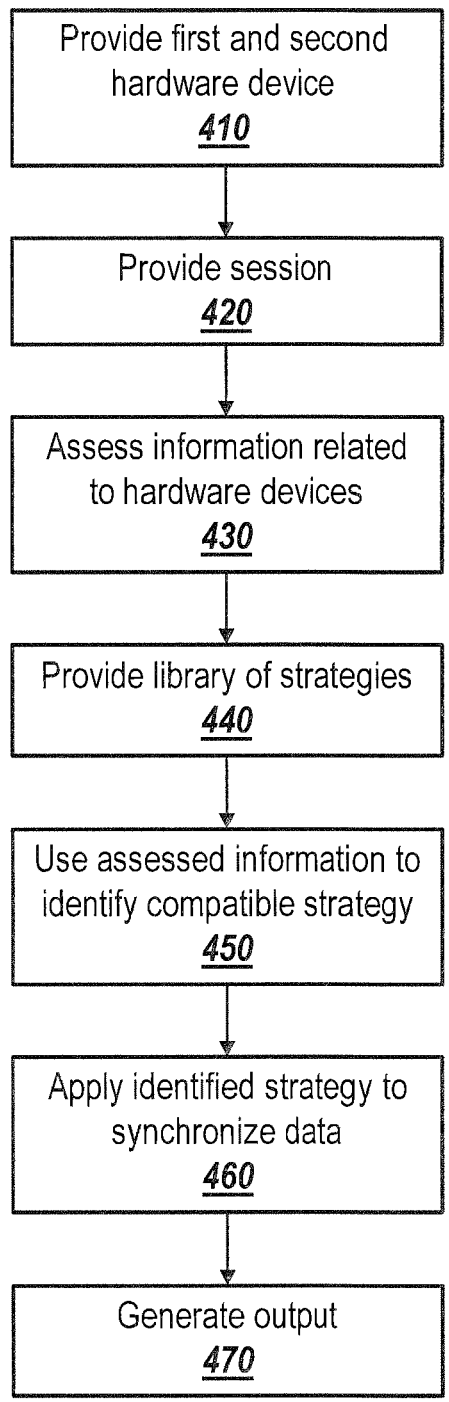
FIG. 4 is a flowchart depicting exemplary acts for synchronizing data obtained by two or more hardware devices.

As noted above, the session applies logic or heuristics in order to select and apply a synchronization strategy. FIG. 4 is a flowchart depicting a suitable acts for synchronizing data obtained by two or more hardware devices. The acts depicted in FIG. 4 may be employed in a computer or electronic device. For example, one or more of the acts may be performed using one or more electronic devices, such as a computer, a hardware device, a measurement device, an acquisition device, a device under test, a processor, or other suitable electronic devices. Instructions may be provided that, when executed by one or more processors associated with the electronic devices, may cause the one or more processors to implement the functionality of one or more of the acts.

Alternatively, the acts may be embedded as instructions in a tangible non-transitory computer readable storage medium, such as, for example, magnetic disks, optical disks, flash devices, and dynamic random access memory (DRAM) devices. Executing the instructions may cause one or more processors to implement the functionality of one or more acts. The acts depicted in FIG. 4 may also be embodied in a system or device. The system or device may include one or more processors for carrying out functionality of one or more of the acts.

At block 410, two or more hardware devices are provided. A first hardware device may send or receive a first data stream, and a second hardware device may send or receive a second data stream. In some embodiments, the first and second data streams may be the same (for example, the first hardware device may send a data stream to the second hardware device, either directly or indirectly), but more typically, the first and second data streams will be different data streams. For example, each hardware device may send or receive an independent data stream. The first data stream may represent data obtained using the first hardware device, and/or the second data stream may represent data obtained using the second hardware device. The first and second data streams may initially be unsynchronized or the status of synchronization for the first and second data streams may be unknown.

The first and second hardware devices may be measurement devices. If one or more measurement devices are provided, the first data stream and the second data stream may include data obtained by the first hardware device and the second hardware device, respectively, while performing a measurement. In some embodiments, the first hardware device and the second hardware device are manufactured by different vendors.

In some embodiments, the first hardware device may operate in a first domain that describes a type of data collected by the first hardware device, and the second hardware device hardware device may operate in a second domain that describes a type of data collected by the second hardware device, and the first domain and the second domain may be different. In some embodiments, the first domain may represent a format of data in the first data stream and the second domain may represent a format of data in the second data stream. Some examples of domains may include a domain described by a stream of one-dimensional data, a stream of multi-dimensional data, event-based data, time-based data, stream-based data, and frequency-based data.

One-dimensional data may include data described by a single value. A single reading of a measurement device, which may be described using a single variable, may be one-dimensional data, depending on the measurement device. For example, a temperature reading and a pressure reading may be represented as one-dimensional data.

Multi-dimensional data may include data described by more than one value. A single reading of a measurement device, which can be described using two or more variables, may be multi-dimensional data. For example, a pixel reading from a camera may involve values for red, green, and blue (RGB). A single RGB value may be multi-dimensional data. Another example may include a GPS system describing a location in terms of longitude and latitude. Such a system may provide the longitude and latitude as two-dimensional data.

A stream of one-dimensional data or multi-dimensional data may involve units of data that may be transmitted in a sequence. The stream may be frame-based, where multiple units of data may be packaged together in a single transmission, or non-frame-based, where one unit of data may be transmitted at a time. A data stream may be of arbitrary size. For example, a stream of multiple temperature readings over time may be a stream of one-dimensional data, whereas a stream of multiple RGB pixel values over time may be a stream of three-dimensional data. Data in a stream may or may not be described with respect to time. Data in the stream that is not described with respect to time may be transmitted arbitrarily.

Event-based data may include information describing how or when a prescribed event occurs. Examples of event based data may include messages describing when a change in state occurs for a particular object, device, or component. A message may be generated when the event occurs.

Time-based data may include data that may be dependent upon time or varies with time. Time-based data may be, but is not necessarily, data in a stream that is correlated to time. Alternatively, time-based data may be a representation of relative or absolute time, such as a clock signal.

Frequency-based data may include data that may be related to frequency. For example, audio and video data typically include a frequency component or frequency information. In some embodiments, information may be encoded into frequency-based data by varying a frequency.

At block 420, a session may be provided that may be associated with the first hardware device and the second hardware device. The session may be provided, for example, by an electronic device such as a computer that may communicate with the first hardware device and the second hardware device. The session may be provided in a software environment that may be used to represent or analyze the system or data. Some exemplary software environments may include, but are not limited to, MATLAB or Simulink. Exemplary software environments are described in more detail with respect to FIGS. 9 and 10, below. The session may also be associated with an acquisition device that may be accessible to the first hardware device and the second hardware device.

At block 430, information related to the first hardware device and/or the second hardware device may be assessed. The session may assess the information. The information may include, but is not limited to, the type of one of the hardware devices, the vendor of one of the hardware devices, communication paths that may be present between the first hardware device and the second hardware device, or a connection that may be present between the first hardware device and the second hardware device. In order to assess the information, the session may obtain, analyze, and/or process information related to the first hardware device and/or the second hardware device. The session may identify characteristics, parameters, configurations, or settings associated with one or more of the hardware devices. The system may identify communication paths between two or more hardware devices, or the session may identify ports, inputs, and/or outputs that may be used to communicate between devices. If the session identifies one or more ports, inputs, and/or outputs that may be used to communicate between two or more hardware devices, the session may determine whether the two or more ports, inputs, and or outputs include compatible hardware or are capable of communicating using compatible protocols.

The information may be obtained by querying the first hardware device or the second hardware device. For example, the session may query one or more of the hardware devices. Alternatively, the information may be supplied through a graphical or textual interface, such as those depicted in FIGS. 5A and 5B, or by other sources, such as, for example, a database, file, and/or data packet.

At block 440, a library of strategies may be provided, as discussed above. A strategy in the library may be related to a synchronization of either the first data stream or the second data stream, of the first hardware device and the second hardware device. A plurality of strategies may be provided in the library. The library may include rules which may be applied by the session to the first and second hardware devices and/or the first and second data streams, or may be a collection of predefined system configurations that the session may attempt to match against the present configuration of the system.

At block 450, the accessed information may be used to identify a strategy from among a plurality of strategies for synchronizing, for example, the first data stream and the second data stream, the first hardware device and the second hardware device, or both the hardware devices and the data streams. For example, the session may compare the assessed information to a configuration described by the strategies in the library in order to determine which strategy may most closely correspond to a present configuration of the hardware devices and data streams. The strategies may be ranked based on their degree of correspondence to the present configuration of the system represented by the first and second hardware devices and first and second data streams, and the strategy with the highest rank may be selected. If the hardware devices are measurement devices used for acquiring data during an analysis of an acquisition device, the selected strategy may relate to processing the data acquired during the analysis.

The comparison may involve weighting strategic factors so that faster, more efficient, or simpler strategies are chosen over other strategies. Additionally, the strategies may be ranked based on the estimated accuracy of data synchronization using the strategy, their degree of complexity, or other factors.

At block 460, the identified strategy may be applied in order to synchronize either the first data stream and the second data stream or the first hardware device and the second hardware device. The strategy may be applied by the session. For example, if the strategy involves post processing of one or more of the data streams, the session may retrieve or access the data and perform the post processing.

In some embodiments, the first and second data stream may be represented as a series of points or units of data. The strategies may align corresponding points or units in the first data stream and the second data stream in order to align the data streams.

At block 470, an output may be generated which includes information for aligning corresponding points in the first data stream and the second data stream in accordance with the selected strategy. The output may be generated by the session.

The output may include information that allows the data streams to be aligned at a later time, or the output may include a representation of the aligned data streams. For example, the output may include a time array made up of a plurality of aligned data streams, as described in more detail with reference to FIGS. 5A and 5B, below.

The output may be persistently stored so that the output is available for offline use. In some embodiments, the output may be presented to a user using a graphical or textual user interface.

In some embodiments, the hardware devices may be represented in a block diagram modeling environment as components in a block diagram model. For example, the first hardware device may be represented as a first component in the block diagram model and the second hardware device may be represented as a second component in the block diagram model. The session may or may not be represented in the block diagram model. In a block diagram modeling situation, the identified strategy may be applied to the first component and the second component by the session using the block diagram modeling environment. In other embodiments, an array-based environment may be used to synchronize the first data stream and the second data stream using the identified strategy.

The acts described above with respect to FIG. 4 need not be performed in the order shown. Acts depicted in FIG. 4 as occurring in a serial fashion may be performed in parallel, or in a different order. For example, the acts at blocks 410 and 420 may be performed together or in the opposite order.

Figure 5A:
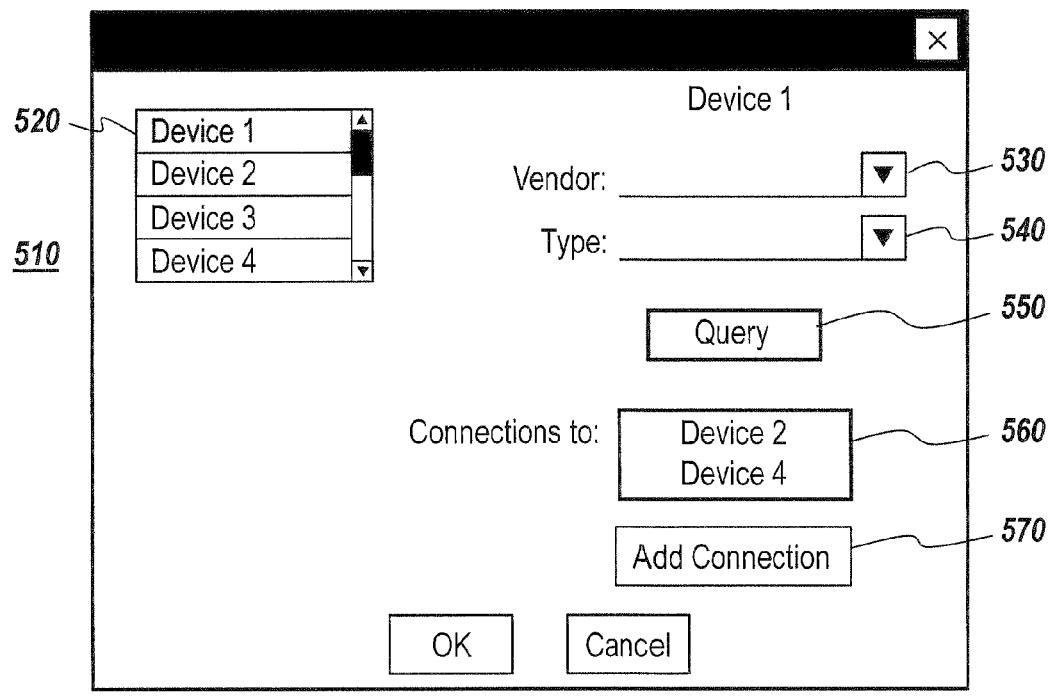
FIG. 5A depicts an exemplary graphical user interface for specifying device parameters according to an exemplary embodiment.

Some of the acts shown in FIG. 4 may be facilitated by providing input from a user or other source. For example, FIG. 5A depicts an exemplary graphical interface 510 that may be used to specify device parameters according to an exemplary embodiment. The graphical interface 510 (and the textual interface 580 of FIG. 5B) may be provided by a session or by a software environment associated with the session. The graphical interface 510 may be provided on a display device associated with the session or the software environment. The graphical interface 510 may also be provided by, or be associated with, one or more of the hardware devices associated with the session. For example, the graphical interface 510 may be provided by the hardware device whose parameters are set through the graphical interface 510. The graphical interface 510 may allow a user to supply information related to one or more of the hardware devices and/or one or more of the data streams to the session. The information supplied through graphical interface 510 may be used to assess information related to the hardware devices and data streams and/or the configuration of the system (including the hardware devices and/or data streams) as a whole.

Referring to FIG. 5A, the graphical interface 510 may include a device list 520. The device list 520 is a list of each of the devices accessible to a session associated with the graphical interface 510. Devices that may be accessible to the session may include Devices 1-4. In response to a selection of one of the devices in the device list 520, the graphical interface may display information relevant to the selected device and may provide one or more fields for receiving inputs relevant to the selected device.

For example, the vendor 530 and type 540 of the device may be entered in appropriate fields. The fields may involve a drop-down menu that may allow a user to select from a number of predefined device vendors and types, or the fields may text fields. The type 540 of the device may pertain to a type of data collected by the selected device, an interface technology used by the device, or other information relevant to the operation of the device or information useful for synchronizing the device.

Instead of manually entering information about the device, a query option 550 may be provided in the graphical interface 510. After selecting the query option 550, the session may attempt to communicate with the device using any of a number of predefined protocols in order to attempt to learn information about the device. If information is successfully retrieved from the device, corresponding fields in the graphical interface 510 may be auto populated with the device information.

The graphical interface 510 may also include a connections window 560 that displays the other devices the selected device is connected to, either directly or indirectly. A user may manually specify that the selected device is connected to other devices by selecting the Add Connection option 570 and providing relevant information about the connection.

It should be noted that other fields may be provided for accepting additional relevant information, such as, for example, a selected device's sample rate, and number and type of input and/or output ports.

Figure 5B:
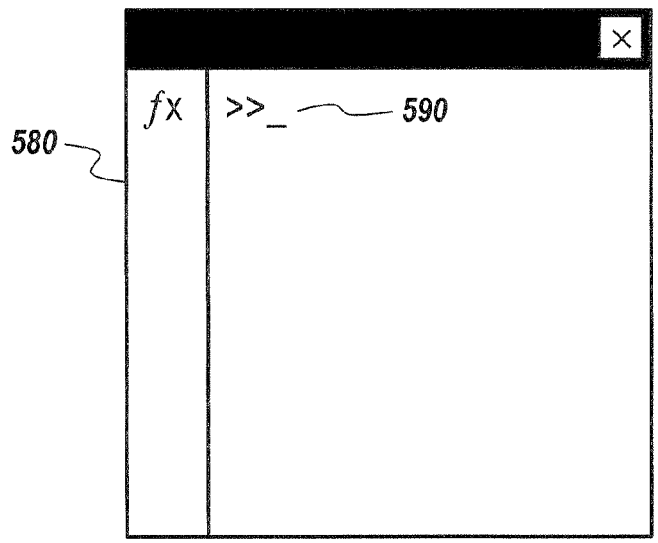
FIG. 5B depicts an exemplary textual interface for specifying device parameters according to an exemplary embodiment.

The information about the selected device need not be provided in a graphical interface. For example, FIG. 5B depicts an exemplary textual interface 580 that may be used to specify device parameters according to an exemplary embodiment. In textual interface 580, a prompt 590 is provided so that a user may enter one or more structured commands defining configuration parameters for one or more devices. Multiple commands may be stored in a file, which may be accessed through the textual interface 580 so that the commands in the file can be executed by issuing a single command.

In determining how to align the data, it may be the case that the library of strategies includes more than one strategy that is consistent with the configuration of the hardware devices and/or data streams. Therefore, it may be necessary to choose from among the available strategies.

Figure 6:
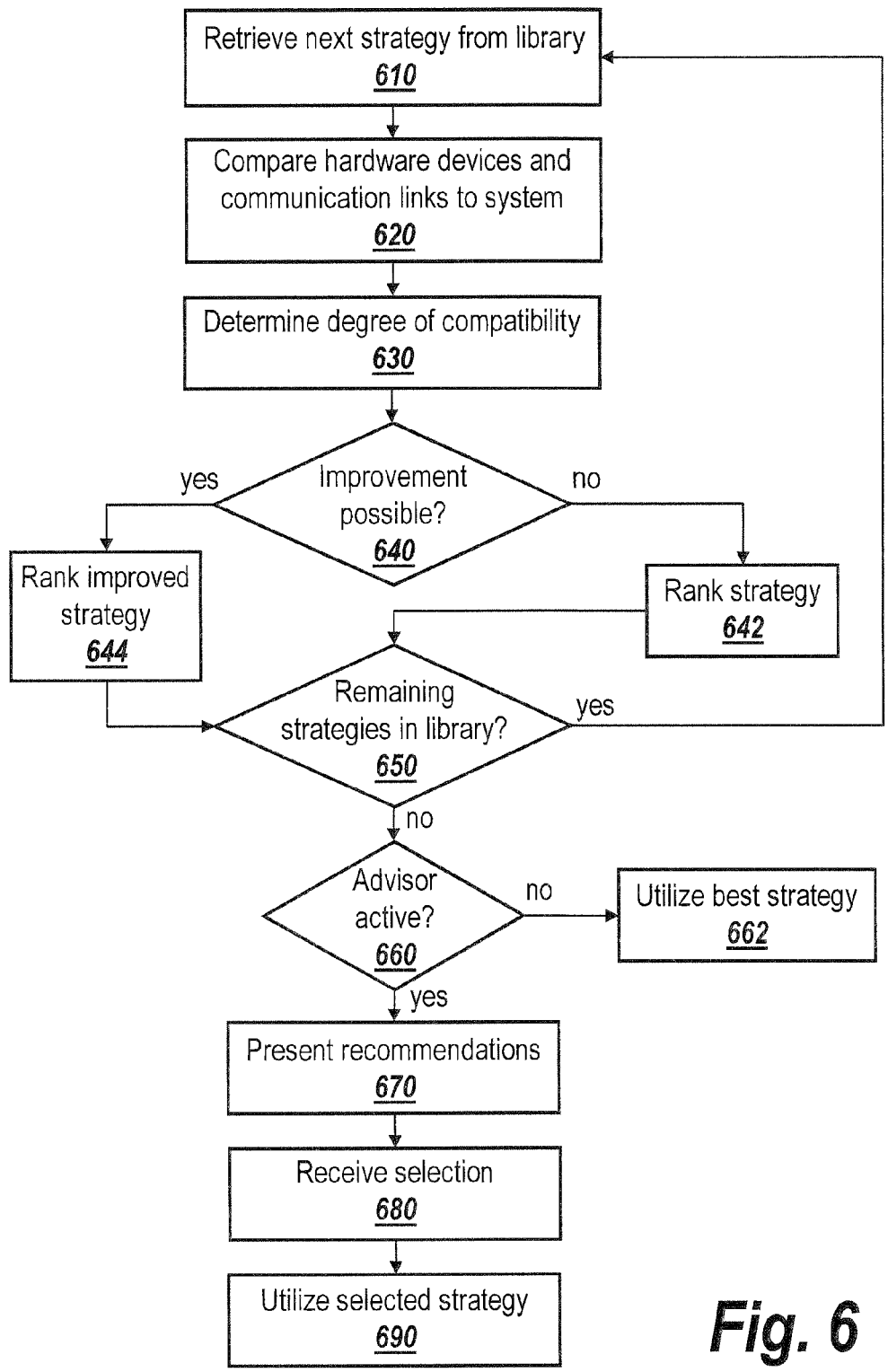
FIG. 6 is a flowchart depicting exemplary acts for selecting a strategy for synchronizing data.

FIG. 6 is a flowchart depicting exemplary acts that may be used to select a strategy for synchronizing data from among the plurality of available strategies. At block 610, a next strategy may be obtained from a library of synchronization strategies. The next strategy may be, for example, a representation of a system with information related to how elements in the system, such as hardware devices, may be synchronized. An exemplary system is presented in FIG. 7A, while exemplary synchronization strategies are presented in FIGS. 7B and 7C.

At block 620, the retrieved strategy may be compared to the hardware devices, communication links, and structure of the data streams that are present in a system. The comparison may be made on the basis of information obtained by the session that may be related to the system, such as information obtained through the interfaces depicted in FIGS. 4A and 4B.

At block 630, a degree of compatibility between the strategy and the present system may be calculated. For example, if the strategy matches the system exactly in terms of number and type of hardware devices, communication paths, and data streams, the strategy may be assigned a degree of compatibility of 100 percent. If one or more elements that are present in the system are missing from the strategy or if one or more elements that are present in the strategy are missing from the system, the strategy may be assigned a degree of compatibility below 100 percent. The degree of compatibility assigned may depend on the degree of importance assigned to the missing elements. If incompatible elements are identified between the strategy and the system such that the strategy could not be used to synchronize the system, the strategy may be assigned a degree of compatibility of zero percent.

The degree of compatibility need not be represented as a percentage, but may include a strategy that qualitatively or quantitatively determines the correspondence between the strategy and the system. A degree of compatibility need not be explicitly calculated; for example, the session may iterate through the library until a strategy that is capable of synchronizing the data is located, and the strategy may be used to synchronize the data.

Although a particular type of strategies has been described, other types of strategies may also be applicable. For example, the strategies may consist of lists of conditions and rules to be applied to the system in question. The strategies could be ranked based on whether the system meets the conditions in the strategy.

One or more optimizations may be employed at blocks 620 and 630 in order to speed processing. For example, if a similar strategy has already been evaluated, it may be possible to determine the degree of correspondence between the present strategy and the system by comparing the differences between the present strategy and the previously evaluated strategy. This may save processing time, particularly if the system or strategies are large or complex. Alternatively, the strategy may first be checked to determine if the strategy is in some way incompatible with the system. In that case, the strategy may be assigned a degree of compatibility of zero percent without the need to further evaluate the strategy. In some embodiments, once a strategy with a degree of compatibility above a certain threshold is found (e.g., an acceptable strategy that will successfully synchronize the devices or data streams in the system), processing may cease and the acceptable strategy may be used to synchronize the system.

Once a degree of compatibility between the strategy and the system is determined, it may optionally be determined at block 640 whether an improvement may be made in the system in order to raise the degree of compatibility between the system and the strategy. For example, if the strategy is identical to the system, except that the strategy involves a communication link provided between two hardware devices which is not present in the system, it may be determined whether such a communication link could be provided between the corresponding hardware devices in the system. If it is determined that such an improvement is compatible with the system, processing may proceed to block 644. If an improvement is not possible, for example because the devices do not have compatible communication ports available or because no improvement has been identified, processing may proceed to block 642.

At block 642, the strategy may be ranked among the other strategies based on the degree of compatibility calculated in block 630. For example, if a degree of compatibility has been determined for two strategies in the library, the strategies may be ranked based on which strategy has the higher degree of compatibility. Any appropriate sorting technique may be used to maintain the ranked strategies in ranked order.

At block 644, wherein it has been determined that an improvement to the system is possible so that the system may be made compatible with the strategy, the strategy may be ranked as in block 642 along with a notation that the system should be modified in some way.

At block 650, it may be determined whether there are remaining strategies in the library. If so, the acts at blocks 610-650 may be repeated for the remaining strategies in the library.

At block 660, it may be determined whether the advisory functionality of the session is active. In certain embodiments, it may be possible to designate that the session operate in an advisory capacity so that recommendations for synchronizing devices or data streams in the system are not automatically utilized. Instead, recommendations are presented to a user so that the user may select which strategy or strategies are employed.

If the advisory functionality is not active, the best available strategy, based on the ranking calculated at blocks 642 and 644, may be utilized at block 662. It should be noted that, if a notation was made at block 644 that the strategy in question requires modifications to be made to the system, the modifications may need to be made to the system before the strategy is employed at block 662. Otherwise, the next-best strategy may be used, if the next-best strategy may be employed without making modifications to the system. Evaluation of the best available strategy may proceed down the ranked list of strategies until a strategy is found that may be employed without modifying the system. If no strategy is available or compatible, an error may be presented to a user.

If the advisory functionality is active, at block 670, the session may present or display one or more of the identified synchronization strategies on a display. The session may present a predetermined number of strategies (e.g., top ten ranked strategies) or all of the strategies that meet a threshold degree of compatibility with the system in question (e.g., all strategies that have a degree of compatibility of 90 percent or above, and/or all strategies that would have a degree of compatibility of 90 percent or above if the improvements identified in blocks 640 and 644 were made to the system).

At block 680, the session may receive a selection of one or more of the recommended strategies. The session may receive the selection through a graphical or textual interface, or through some other input means. If the user does not specify a selection, a default strategy may be used (for example, in accordance with block 662).

At block 690, the selected strategy may be used to synchronize the data. For example, the selected strategy may align corresponding points in two or more data streams in order to generate an output data array or matrix that includes the aligned data streams.

Figure 7A:
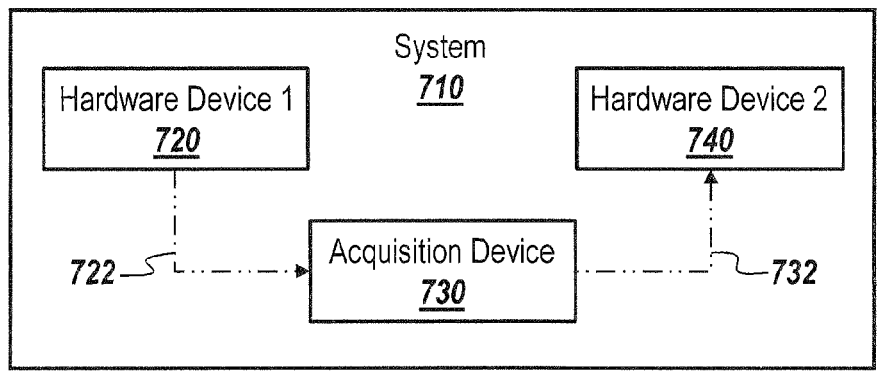
FIG. 7A depicts a system comprising two hardware devices and a device under test.
Figure 7B:
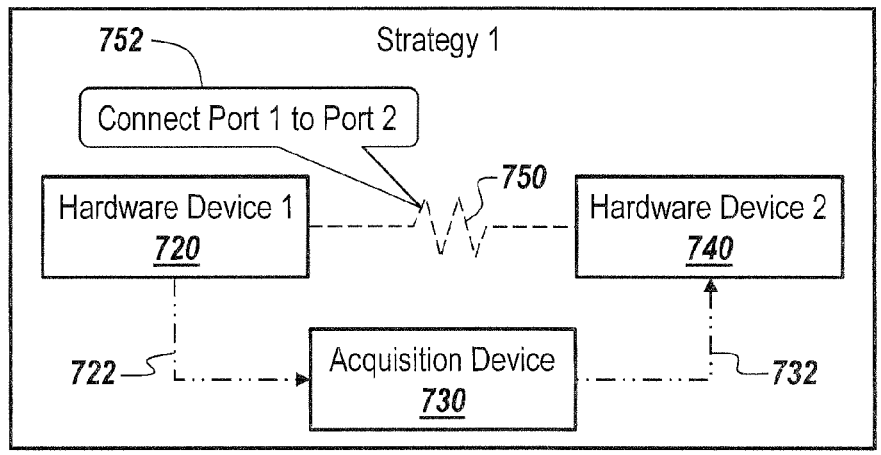
FIG. 7B depicts a first potential strategy for synchronizing hardware devices.
Figure 7C:
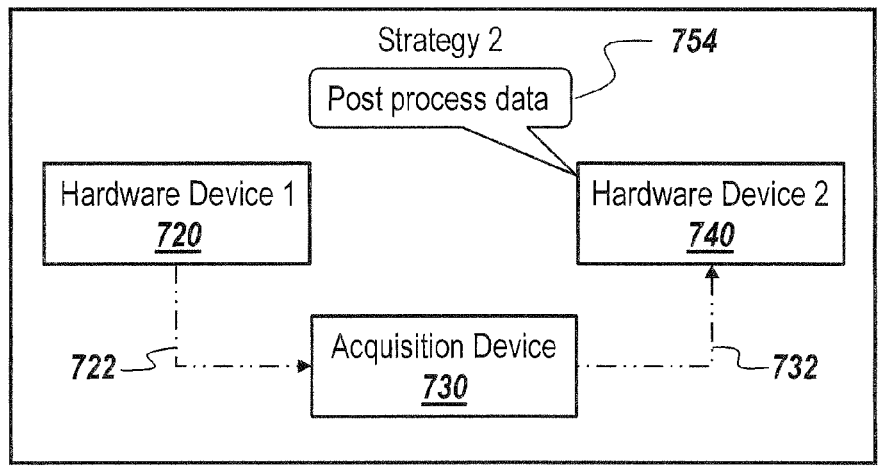
FIG. 7C depicts a second potential strategy for synchronizing hardware devices.

An exemplary method for evaluating and applying strategies to a system is depicted in FIGS. 7A-7C. FIG. 7A depicts an exemplary system 710 having two hardware devices 720, 740 and an acquisition device 730. The first hardware device 720 may send a first data stream 722 to acquisition device 730, which may process the first data stream 722. The acquisition device may transmit a second data stream 732, which may be received by the second hardware device 740.

In the situation depicted in FIG. 7A, it may be necessary to synchronize the hardware devices 720 and 740, or the data streams 722 and 732, or both, in order to ensure that accurate measurements of the acquisition device 730 may be achieved. Accordingly, FIG. 7B depicts a first potential strategy for synchronizing hardware devices 720, 740. The strategy depicted in FIG. 7B may correspond to a strategy stored in the library of strategies, which may be compared to the system and evaluated for compatibility.

In the strategy depicted in FIG. 7B, the first and second hardware devices 720, 740 may be connected by a communication link 750. Because the communication link 750 was not present in the system of FIG. 7A, the strategy of FIG. 7B may be presented to the user with a dashed line representing the non-existent communication link. Note that other suitable means may be employed to highlight the differences between the proposed strategy and the system 710.

Although the strategy of FIG. 7B may not yet be compatible with the system depicted in FIG. 7A (due to the lack of the communication link 750 in the system 710), the session may recognize that the strategy of FIG. 7B may be made compatible with the system 710 by connecting one of the output ports of the first hardware device 720 to one of the input ports of the second hardware device 740. Accordingly, the session may issue a recommendation 752 to connect the two ports.

During strategy evaluation (e.g., FIG. 6), the strategy of FIG. 7B might receive a degree of compatibility of zero percent because the strategy may not, by itself, be used to synchronize the hardware devices 720, 740 due to the lack of the communication link 750 in the system 710. However, at blocks 640 and 644 of FIG. 6, the strategy might receive a prospective degree of compatibility of 100 percent, with the caveat that the communication link 750 must be established.

FIG. 7C shows the first and second hardware devices 720, 740 unconnected by a communication link. Instead of recommending that the communication link be provided, the session may recognize that it may be possible to synchronize the data streams 722, 732 by post processing the data (e.g., by subtracting a latency factor from the data received at the second hardware device 740 to account for system latency). Accordingly, the strategy may be presented to a user with the notation 754 that data will be post-processed. Because the strategy shown in FIG. 7C is capable of synchronizing the system 710 of FIG. 7A, the strategy of FIG. 7C might receive a degree of compatibility of 100 percent.

The strategies depicted in FIGS. 7B and 7C may further be weighted prior to ranking. For example, it may be the case that the strategy shown in FIG. 7C may not be guaranteed to give completely accurate results due to the lack of a direct line of communication between the first and second hardware devices 720, 740. Accordingly, the degree of compatibility might be weighted down (e.g., to 90 percent) in order to account for this fact. Such a weighting may allow a more accurate strategy, such as the proposed system modification shown in FIG. 7B, to serve as the basis for an improved recommendation.

Figure 8:
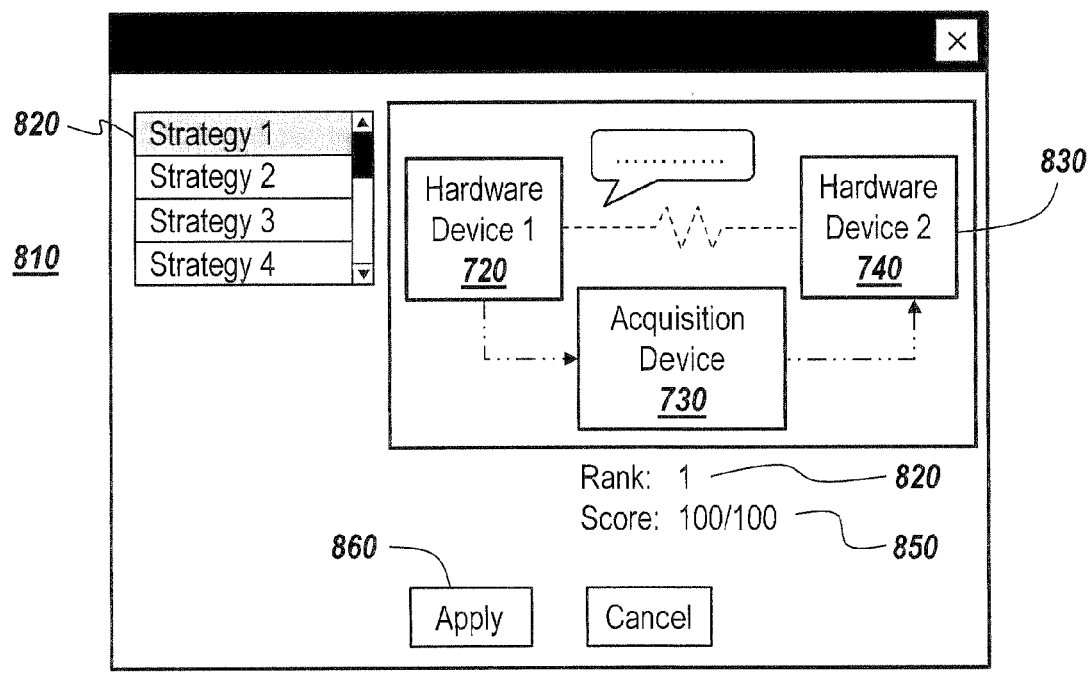
FIG. 8 depicts an exemplary interface for selecting a synchronization strategy for synchronizing two hardware devices.

After the session assigns a degree of compatibility and/or ranking to the strategies in the library, the session may (in the advisory role) present one or more of the strategies to a user. FIG. 8 depicts an exemplary interface 810 that may be used to select a synchronization strategy for synchronizing two hardware devices.

Referring to FIG. 8, the interface 810 may include a number of fields to assist a user in evaluating and applying possible synchronization strategies. For example, a strategy list 820 may provide a list of strategies that may have been deemed to be compatible with the present system configuration. A user may select a strategy in the strategy list 820, which may cause the interface 810 to present details related to the selected strategy.

For example, in FIG. 8, a user has selected strategy 1. Accordingly, a summary window 830 is provided to graphically display the selected strategy and any recommendations for modifying the system to make the system compatible with the proposed strategy. The interface 810 may also provide the strategy's rank 840 among the strategies in the library, and the strategy's compatibility score 850. If the user determines that the selected strategy should be applied to synchronize the hardware devices or data streams in the system, the user may make a selection 860 to apply the selected strategy.

Figure 9:
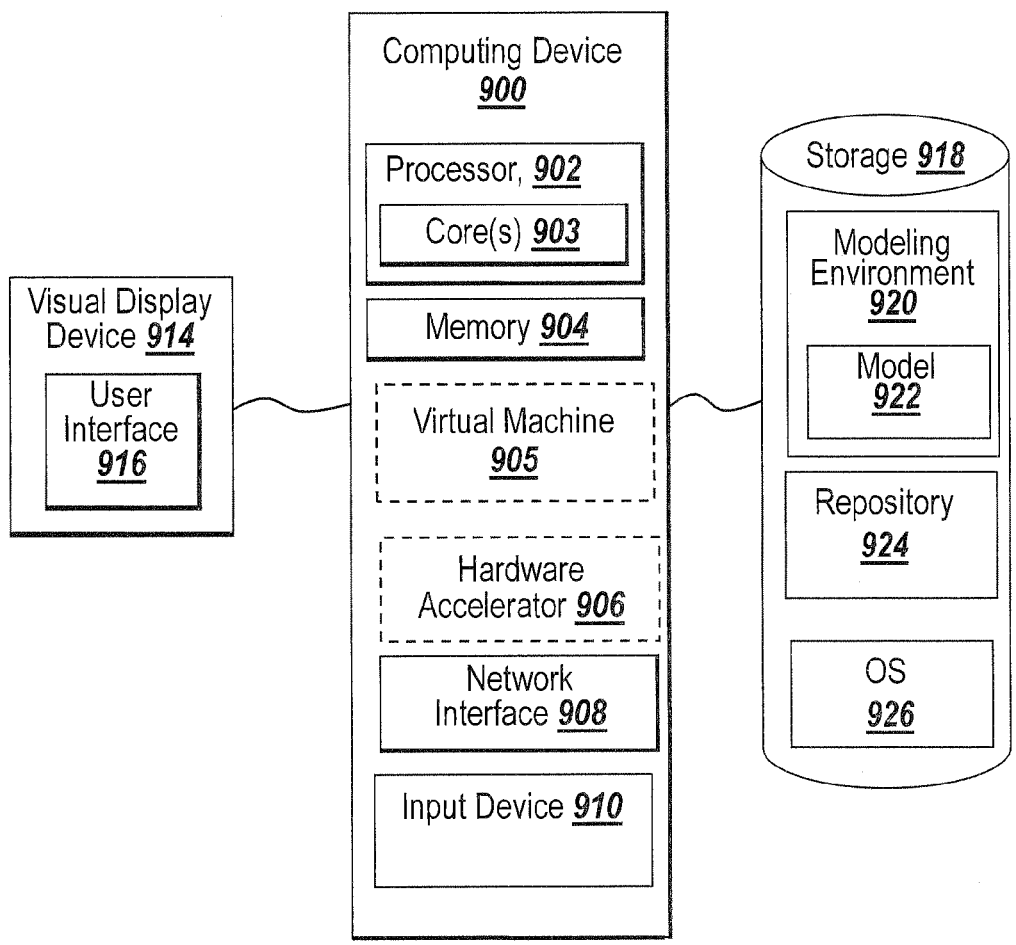
FIG. 9 depicts an exemplary computing device suitable for practicing exemplary embodiments.

The above-described methodology may be practiced in any suitable electronic device. FIG. 9 depicts an exemplary electronic device 900 that may be suitable for practicing one or more exemplary embodiments described herein. The electronic device 900 may take many forms, including but not limited to a computer, workstation, server, network computer, quantum computer, optical computer, Internet appliance, mobile device, a pager, a tablet computer, a smart sensor, netbook, and application specific processing device.

The implementation of FIG. 9 is illustrative and may take other forms. For example, an alternative implementation of the electronic device 900 may have fewer components, more components, or components that are in a configuration that differs from the configuration of FIG. 9. The components of FIG. 9 and/or other figures described herein may be implemented in hardware based logic, software based logic and/or logic that is a combination of hardware and software based logic (e.g., hybrid logic); therefore, the components of FIG. 9 and/or other figures are not limited to a specific type of logic.

The processor 902 may include hardware or software based logic to execute instructions on behalf of the electronic device 900. In one implementation, the processor 902 may include one or more processors, such as a microprocessor. In one implementation, the processor 902 may include hardware, such as a digital signal processor (DSP), a field programmable gate array (FPGA), a Graphics Processing Unit (GPU), an application specific integrated circuit (ASIC), a general-purpose processor (GPP), etc., on which at least a part of applications can be executed. In another implementation, the processor 902 may include single or multiple cores 903 for executing software stored in a memory 904, or other programs for controlling the electronic device 900.

The electronic device 900 may include one or more tangible computer-readable storage media for storing one or more computer-executable instructions or software for implementing one or more embodiments of the invention. For example, a memory 904 included in association with the electronic device 900 may store computer-executable instructions or software, e.g., instructions for implementing and processing every module of a programming environment. The memory 904 may include a computer system memory or random access memory (RAM), such as dynamic RAM (DRAM), static RAM (SRAM), extended data out RAM (EDO RAM), or other types of RAM. The memory 904 may include other types of memory as well, or combinations thereof.

In one implementation, one or more processors 902 may include virtual machine (VM) 905 for executing the instructions loaded in the memory 904. A virtual machine 905 may be provided to handle a process running on multiple processors so that the process appears to be using only one computing resource rather than multiple. Virtualization may be employed in the electronic device 900 so that infrastructure and resources in the electronic device can be shared dynamically. Multiple VMs 905 may be resident on a single processor 902.

A hardware accelerator 906, such as implemented in an ASIC, FPGA, or the like, may additionally be used, for example, to speed up the general processing rate of the electronic device 900.

Additionally, the electronic device 900 may include a network interface 908 to interface to a network, such as, for example, a Local Area Network (LAN), Wide Area Network (WAN) or the Internet, through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. Network interface 908 may include a built-in network adapter, network interface card, personal computer memory card international association (PCMCIA) network card, card bus network adapter, wireless network adapter, universal serial bus (USB) network adapter, modem or any other device suitable for interfacing the electronic device 900 to any type of network capable of communication and performing the operations described herein.

The electronic device 900 may include one or more input/output (I/O) devices 910 such a keyboard, a multi-point touch interface, or a pointing device, for example a mouse, for receiving input from a user. The electronic device 900 may include other suitable I/O peripherals.

The input devices 910 may be connected to a visual display device 914. A graphical user interface (GUI) 916 may be shown on the display device 914.

A storage device 918 may also be associated with the computer 900. The storage device 918 may be, for example, a hard-drive, CD-ROM or DVD, Zip Drive, tape drive, or other suitable tangible computer readable storage medium capable of storing information. The storage device 918 may be a form of online or shared storage, such as a skydrive or cloud storage system. The storage device 918 may be useful for storing application software programs, such as a modeling application or environment 920 (such as, for example, modeling environment 1000 depicted in FIG. 10) including a model 922, and for storing a repository 1004 and an operating system (OS).

The electronic device 900 can be running any operating system 926 such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile electronic devices, or any other operating system capable of running on the electronic device and performing the operations described herein. The operating system may be running in native mode or emulated mode.

One or more embodiments of the invention may be provided as one or more computer-readable programs that may be stored on or in one or more tangible non-transitory computer-readable storage mediums, such as, for example, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), and a magnetic tape.

In general, the computer-readable programs may be implemented in any programming language. Some examples of languages that may be used include Python, C, C++, C#, Java, Javascript, a hardware description language (HDL), Unified Modeling Language (UML), and a programmable logic controller (PLC) language. Further, the computer readable programs may be implemented in a hardware description language or any other language that allows prescribing computation. The computer-readable programs may be stored on or in one or more mediums as object code. Instructions in the programming languages may be executed by one or more processors to implement the computer readable programs described in the programming languages, or alternatively the instructions may be implemented directly by hardware components other than a processor.

Figure 10:
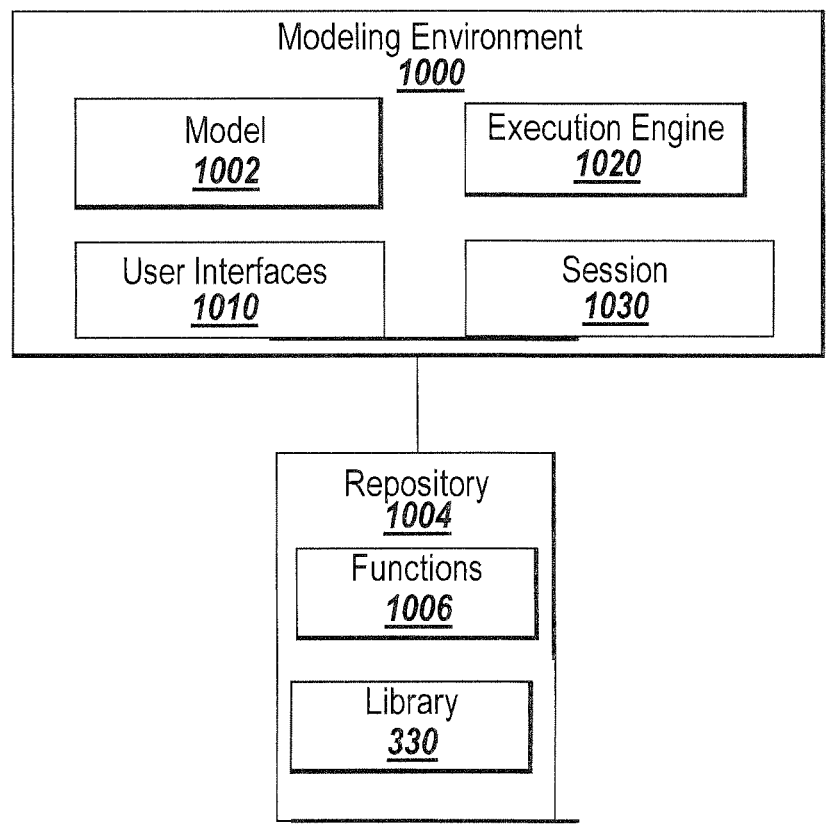
FIG. 10 depicts a modeling environment suitable for practicing exemplary embodiments.

The exemplary synchronization methods described herein may be employed in conjunction with a model developed in a modeling environment. FIG. 10 depicts an embodiment of modeling environment 1000 and repository 1004 in detail. The modeling environment 100 may run on any operating system such as any of the versions of the Microsoft® Windows operating systems, the different releases of the Unix and Linux operating systems, versions of the MacOS® operating system for Macintosh computers, embedded operating systems, real-time operating systems, open source operating systems, proprietary operating systems, operating systems for mobile electronic devices, or other operating systems capable of running on the electronic device and performing the operations described herein. Furthermore, the operating system and the modeling environment 1000 can be run from a bootable CD, such as, for example, KNOPPIX®, a bootable CD for GNU/Linux.

The modeling environment 1000 may enable a user to build and execute a model 1002 of a system, such as a dynamic system. The modeling application or environment 1000 may include a text-based modeling environment, a graphical-based modeling environment, or some combination thereof. Examples of modeling environments may include the MATLAB® environment, from The MathWorks, Inc., LabVIEW® or MATRIXx from National Instruments, Inc., Mathematica® from Wolfram Research, Inc., MathCAD of Mathsoft Engineering & Education Inc., Maple™ from Maplesoft, a division of Waterloo Maple Inc., Comsol from Comsol AB of Sweden, Scilab™ from The French National Institution for Research in Computer Science and Control (INRIA), Le Chesnay Cedex, France, GNU Octave, C++, JAVA, the Simulink® environment, the SimEvents® environment, the Stateflow® environment, the SimMechanics™ environment, SoftWIRE by Measurement Computing, VisSim by Visual Solutions, WiT by DALSA Coreco, VEE Pro by Agilent, Dymola from Dynasim AB, Extend from Imagine That, Inc., Scicos from The French National Institution for Research in Computer Science and Control (INRIA), MSC.Adams® from MSC.Software Corporation, Rhapsody® and Rational® from International Business Machines Corporation, ARTiSAN Studio from ARTiSAN Software Tools, Inc., and SCADE™ from Esterel Technologies, Inc.

In the modeling environment 1000, instructions may be generated for the model 1002, such as source code, intermediate representations, etc., for example for simulation using the model or to execute the model on a target device. The user may also generate instructions that generate instructions for the model 1002 on the target device. The generated instructions may be stored in a repository 1004. The modeling environment 1000 may enable processing the model 1002 using the instructions previously stored in the repository 1004. The repository may further store a library of synchronization strategies, such as the library 330 depicted in FIG. 3.

In an exemplary embodiment, the modeling environment 1000 may be coupled to the repository 1004 so that modeling environment 1000 can communicate with the repository 1004. A user may generate instructions for the model 1002 and store the instructions in the repository 1004. The instructions may be stored in the repository 1004, for example, as functions 1006 in software. The instructions may be stored in the repository 1004 in different form, such as processes that can be implemented in hardware. The instructions stored in the repository 1004 can be shared in processing other models to reduce memory or other requirements for processing other models.

The repository 1004 may refer to a collection of information stored in memory or storage. In an exemplary embodiment, the repository 1004 may be, for example, a database with the code for functions and the checksums for each function.

The modeling environment 1000 may include user interfaces 1010, an execution engine 1020, and other components not pictured. The modeling environment 1000 may allow a user to build model 1002 of a system using user interfaces 1010. The model 1002 may include, for example, blocks and lines. The blocks may define operations, and the lines may define relationships between the blocks.

The execution engine 1020 may compile and link the model 1002 to generate an executable form of instructions for carrying out execution of the model. The model 1002 may be executed to simulate the system represented by the model 1002. The simulation of the model 1002 may determine the behavior of the system represented by the model 1002.

The execution engine 1020 may convert the model into the executable form of instructions using a directed graph. The execution engine 1020 may carry out the task of compiling and linking the model to produce an in-memory executable version of the model that is used for generating code and/or executing a model. The in-memory representation of the model may be executed to determine the behavior of the model. The compile stage may involve checking the integrity and validity of the component interconnections in the model. In this stage, the execution engine 1020 may also sort the components in the model into hierarchical lists that are used when creating the component method execution lists. In the link stage, the execution engine may use the result of the compiled stage to allocate memory needed for the execution of the various components of the model. The linking stage may also produce component method execution lists that are used by the execution of the model. The block method execution lists are generated because the simulation of a model may execute component methods by type (not by component) when they have a sample hit. The execution engine 1020 may repetitively execute the instructions e.g., via successive time steps from an execution start time to a stop time specified by the user or until the execution is interrupted.

The execution engine 1020 may enable interpretive execution of part or all of the model. Likewise, the execution engine 1020 may enable compiled or accelerated execution of part or all of the model. Combinations of interpretive and compiled or accelerated execution may also be enabled by the execution engine 1020.

A session 1030, as described above, may also be provided in the modeling environment 1000.

Figure 11:
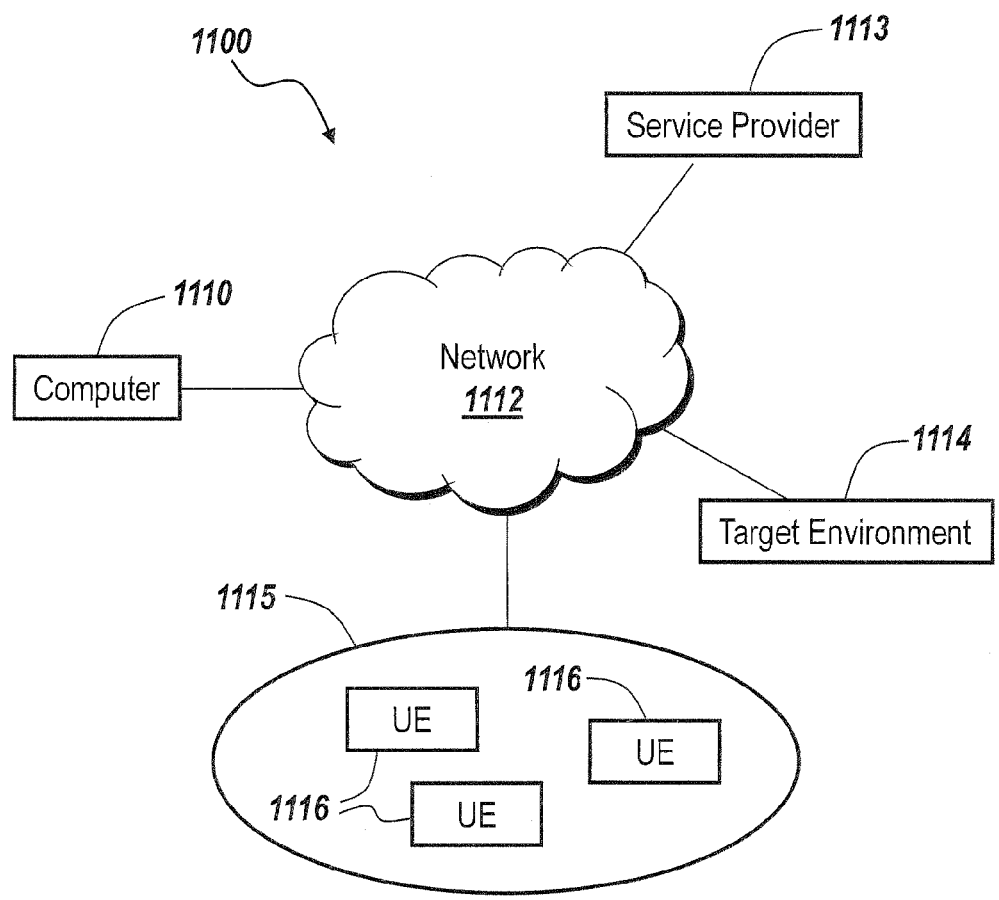
FIG. 11 depicts a networked system suitable for practicing exemplary embodiments.

FIG. 11 illustrates an exemplary distributed implementation suitable for use with the exemplary embodiments described herein. A system 1100 may include a computer 1110 (such as, for example, the electronic device 900 depicted in FIG. 9), a network 1112, a service provider 1113, a target environment 1114, and a cluster 1115. The embodiment of FIG. 11 is exemplary, and other embodiments can include more devices, fewer devices, or devices in arrangements that differ from the arrangement of FIG. 11.

The network 1112 may transport data from a source to a destination. Embodiments of the network 1112 may use network devices, such as routers, switches, firewalls, and/or servers (not shown) and connections (e.g., links) to transport data.

The network 1112 may be a hardwired network using wired conductors and/or optical fibers and/or may be a wireless network using free-space optical, radio frequency (RF), and/or acoustic transmission paths. In an implementation, the network 1112 may be a substantially open public network, such as the Internet. In another implementation, the network 1112 may be a more restricted network, such as a corporate virtual network. The network 1112 may include Internet, intranet, Local Area Network (LAN), Wide Area Network (WAN), Metropolitan Area Network (MAN), wireless network (e.g., using IEEE 802.11, Bluetooth, etc.), etc. The network 1112 may use middleware, such as Common Object Request Broker Architecture (CORBA) or Distributed Component Object Model (DCOM). Implementations of networks and/or devices operating on networks described herein are not limited to any particular data type, protocol, architecture/configuration, etc.

The service provider 1113 may include a device that makes a service available to another device. For example, the service provider 1113 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The target environment 1114 may include a device that receives information over the network 1112. For example, the target environment 1114 may be a device that receives user input from the computer 1110.

The cluster 1115 may include a number of units of execution (UEs) 1116 and may perform processing on behalf of the computer 1100 and/or another device, such as the service provider 1113. For example, in one embodiment, the cluster 1115 may perform parallel processing on an operation received from the computer 1100. The cluster 1115 may include UEs 1116 that reside on a single device or chip or that reside on a number of devices or chips.

The units of execution (UEs) 1116 may include processing devices that perform operations on behalf of a device, such as a requesting device. In one embodiment, a UE can be a microprocessor, field programmable gate array (FPGA), and/or another type of processing device. Embodiments of UE 1116 may include code, such as code for an operating environment. For example, a UE may run a portion of an operating environment that pertains to parallel processing activities. In one embodiment, the service provider 1113 may operate the cluster 1115 and may provide interactive optimization capabilities to the computer 1110 on a subscription basis (e.g., via a web service).

Units of Execution (UEs) provide remote/distributed processing capabilities for our products, such as MATLAB® from The MathWorks, Inc. A hardware unit of execution may include a device (e.g., a hardware resource) that performs and/or participates in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, in one implementation, a hardware unit of execution may include a single processing device that includes multiple cores, and in another implementation, the hardware unit of execution may include a number of processors. A hardware unit of execution may also be a programmable device, such as a field programmable gate array (FPGA), an application specific integrated circuit (ASIC), a digital signal processor (DSP), etc. Devices used in a hardware unit of execution may be arranged in substantially any configuration (or topology), such as a grid, ring, star, etc. A hardware unit of execution may support one or more threads (or processes) when performing processing operations.

A software unit of execution may include a software resource (e.g., a technical computing environment, a worker, a lab, etc.) that performs and/or participates in parallel programming activities. For example, a software unit of execution may perform and/or participate in parallel programming activities in response to a receipt of a program and/or one or more portions of the program. A software unit of execution may perform and/or participate in substantially any type of parallel programming using one or more hardware units of execution. Embodiments of a software unit of execution may support one or more threads and/or processes when performing processing operations.

The term 'parallel programming' may be understood to include multiple types of parallel programming, e.g. task parallel programming, data parallel programming, and stream parallel programming. Parallel programming may include processing that may be distributed across two or more resources (e.g., software units of execution, hardware units of execution, processors, microprocessors, clusters, labs, etc.) and be performed at substantially the same time.

For example, parallel programming may refer to task parallel programming where a number of tasks are processed at substantially the same time on a number of software units of execution. In task parallel programming, each task may be processed independently of other tasks executing at the same time (e.g., a first software unit of execution executing a first task may not communicate with a second software unit of execution executing a second task).

Parallel programming may refer to data parallel programming, where data (e.g., a data set) is parsed into a number of portions that are executed in parallel using two or more software units of execution. In data parallel programming, the software units of execution and/or the data portions may communicate with each other as processing progresses.

Parallel programming may refer to stream parallel programming (also referred to as pipeline parallel programming). Stream parallel programming may use a number of software units of execution arranged in series (e.g., a line) where a first software unit of execution produces a first result that is fed to a second software unit of execution that produces a second result. Stream parallel programming may also include a state where task allocation may be expressed in a directed acyclic graph (DAG) or a cyclic graph with delays).

Note that parallel programming may include a combination of the above-described task, data, or stream parallel programming techniques alone or with other types of processing techniques to form hybrid-parallel programming techniques.

Parallel programming may be applied in exemplary embodiments in a number of ways. For example, multiple sessions may be generated, each session receiving a stream of data. A master session may retrieve data from the other sessions and process the retrieved data as described above. In another exemplary embodiment, each of a plurality of data stream s may be processed by a single session in parallel. Decisions, including further processing decisions, may be made with respect to the data after the session has initially processed the data.

The foregoing description of exemplary embodiments provides illustration and description, but is not intended to be exhaustive or to limit the invention to the precise form disclosed. Modifications and variations are possible in light of the above teachings or may be acquired from practice of the invention. For example, while a series of acts has been described above, the order of the acts may be modified in other implementations consistent with the principles of the invention. Further, non-dependent acts may be performed in parallel.

In addition, implementations consistent with principles of the invention may be implemented using devices and configurations other than those illustrated in the Figures and described in the Specification without departing from the spirit of the invention. Devices and/or components may be added and/or removed from the implementations of the figures depending on specific deployments and/or applications. Also, disclosed implementations may not be limited to any specific combination of hardware.

Furthermore, certain portions of the invention may be implemented as logic that performs one or more functions. This logic may include hardware, such as hardwired logic, an application-specific integrated circuit, a field programmable gate array, a microprocessor, software, wetware, or a combination of hardware and software.

Also, the term "user", as used herein, is intended to be broadly interpreted to include, for example, a computing device (e.g., a workstation) or a user of a computing device, unless otherwise stated.

No element, act, or instruction used in the description of the invention should be construed critical or essential to the invention unless explicitly described as such. Also, as used herein, the article "a" is intended to include one or more items. Where only one item is intended, the term "a single" or similar language is used. Further, the phrase "based on," as used herein is intended to mean "based, at least in part, on" unless explicitly stated otherwise.

The scope of the invention is defined by the claims and their equivalents.

What is claimed is:

1. A non-transitory electronic device readable storage medium storing instructions that, when executed by a processor, cause the processor to:
   interact with a first hardware device,
      the first hardware device sending or receiving a first data stream, and
      the first hardware device associated with first information, the first information describing characteristics of the first hardware device;
   interact with a second hardware device,
      the second hardware device sending or receiving a second data stream, and
      the second hardware device associated with second information, the second information describing characteristics of the second hardware device;
   analyze the first information and the second information to identify one or more of the characteristics of the first hardware device and the second hardware device;
   ranking compatibility of multiple strategies for synchronizing the first data stream and the second data stream with the first hardware device and the second hardware device based on the analyzing;
   identify, based on the ranking, a strategy from the ranked strategies; and
   synchronize, using the identified strategy, the first data stream and the second data stream,
      wherein the synchronizing aligns corresponding points in the first data stream and the second data stream.

2. The storage medium of claim 1, storing instructions that, when executed by the processor, cause the processor to:
   generate an output comprising information for aligning corresponding points in the first data stream and the second data stream, the aligning in accordance with the identified strategy.

3. The storage medium of claim 1, wherein the first information and the second information comprises a type of the first hardware device, a type of the second hardware device, a vendor of the first hardware device, a vendor of the second hardware device, communication paths that are present between the first hardware device or the second hardware device, or a connection between the first hardware device or the second hardware device.

4. The storage medium of claim 1, wherein the identifying comprises recognizing that the first hardware device and the second hardware device are not connected by a communication link.

5. The storage medium of claim 1, wherein the first information and the second information are obtained by querying the first hardware device or the second hardware device.

6. The storage medium of claim 1, wherein the synchronizing is performed post-processing.

7. A method, comprising:
   interacting with a first hardware device in a system at a first location,
      the first hardware device sending or receiving a first data stream;
   interacting with a second hardware device in the system at a second location,
      the second hardware device receiving a second data stream;
   ranking how compatible a first synchronizing strategy for synchronizing the first data stream and the second data stream is with the system;
   ranking how compatible a second synchronizing strategy for synchronizing the first data stream and the second data stream is with the system;
   selecting the second synchronizing strategy based on the ranking of the second synchronizing strategy versus the ranking of the first synchronizing strategy indicating that the second synchronizing strategy is more compatible with the system; and
   synchronizing, using the second synchronizing strategy, the first data stream and the second data stream to align points in the first data stream with points in the second data stream.

8. The method of claim 7, wherein the second synchronizing strategy is implemented based on a received instruction.

9. The method of claim 7, changing between the first synchronizing strategy and the second synchronizing strategy so that the first synchronizing strategy is used to synchronize the first data stream and the second data stream.

10. The method of claim 7, wherein the synchronizing further comprises post-processing the second data stream to account for latency in the second data stream.

11. The method of claim 10, wherein the post-processing comprises subtracting a latency factor from the second data stream.

12. A computing device, comprising:
   a processor executing instructions for:
      providing a system configuration associated with a first hardware device and a second hardware device,
         the first hardware device sending or receiving a first data stream,
         the first hardware device associated with first information, the first information describing characteristics of the first hardware device,
         the second hardware device sending or receiving a second data stream, and
         the second hardware device associated with second information, the second information describing characteristics of the second hardware device, accessing and analyzing, the first information and the second information;

ranking compatibility of multiple strategies for synchronizing the first data stream and the second data stream with the first hardware device and the second hardware device based on the analyzing;

identifying, based on the ranking, a strategy, from among the multiple strategies, for synchronizing the first data stream and the second data stream; and applying the identified strategy to synchronize the first data stream and the second data stream, the applying: aligning points in the first data stream with points in the second data stream.

13. The computing device of claim 12, wherein the processor further executes instructions for:

generating an output comprising information for aligning corresponding points in the first data stream and the second data stream, the aligning in accordance with the selected strategy.

14. The computing device of claim 12, wherein the first information and the second information comprises a type of the first hardware device, a type of the second hardware device, a vendor of the first hardware device, a vendor of the second hardware device, communication paths that are present between the first hardware device or the second hardware device, or a connection between the first hardware device or the second hardware device.

15. The computing device of claim 12, wherein the identifying comprises recognizing that the first hardware device and the second hardware device are not connected by a communication link.

16. The computing device of claim 12, wherein the first information and the second information include information obtained by querying the first hardware device or the second hardware device.

17. The computing device of claim 12, wherein the aligning points is performed post-processing.

* * * * *